United States Patent
Dong et al.

(10) Patent No.: US 9,146,345 B1
(45) Date of Patent: Sep. 29, 2015

(54) HIGH POWER OPTICAL FIBERS

(71) Applicants: Clemson University, Clemson, SC (US); Hokkaido University, Sapporo (JP)

(72) Inventors: Liang Dong, Clemson, SC (US); Kunimasa Saitoh, Sapporo (JP)

(73) Assignees: Clemson University, Clemson, SC (US); Hokkaido University, Sapporo (JP)

( * ) Notice: Subject to any disclaimer, the term of this patent is extended or adjusted under 35 U.S.C. 154(b) by 109 days.

(21) Appl. No.: 13/744,968

(22) Filed: Jan. 18, 2013

Related U.S. Application Data

(60) Provisional application No. 61/588,771, filed on Jan. 20, 2012.

(51) Int. Cl.
*G02B 6/02* (2006.01)
*C03B 37/027* (2006.01)

(52) U.S. Cl.
CPC ........ *G02B 6/02309* (2013.01); *C03B 37/0279* (2013.01); *G02B 6/0238* (2013.01)

(58) Field of Classification Search
CPC ............. G02B 6/02309; G02B 6/0238; G02B 6/02357
See application file for complete search history.

(56) References Cited

U.S. PATENT DOCUMENTS

| | | | |
|---|---|---|---|
| 7,209,619 B2 | 4/2007 | Dong et al. | |
| 7,280,730 B2 * | 10/2007 | Dong et al. | 385/126 |
| 7,349,611 B2 * | 3/2008 | Broeng et al. | 385/125 |
| 7,418,836 B2 | 9/2008 | Dong et al. | |
| 7,792,394 B2 | 9/2010 | Dong et al. | |
| 7,970,248 B2 | 6/2011 | Dong et al. | |
| 7,978,947 B2 | 7/2011 | Goto | |
| 8,159,742 B2 | 4/2012 | Dong et al. | |
| 8,285,098 B2 | 10/2012 | Dong et al. | |
| 8,285,099 B2 | 10/2012 | Dong et al. | |
| 2009/0207483 A1 | 8/2009 | Goto | |
| 2010/0254669 A1 | 10/2010 | Takenaga et al. | |
| 2011/0141757 A1 | 6/2011 | Taru et al. | |

FOREIGN PATENT DOCUMENTS

| | | |
|---|---|---|
| EP | 1 846 784 | 7/2006 |
| EP | 2 082 462 | 10/2008 |
| EP | 2 120 073 A1 | 11/2009 |

(Continued)

OTHER PUBLICATIONS

L. Dong—"*A vector boundary matching technique for efficient and accurate determination of photonic bandgaps in photonoic bandgap fibers.*"—Optics Express, 19 (13); pp. 12582-12593; Jun. 20, 2011.

(Continued)

*Primary Examiner* — Omar R Rojas
(74) *Attorney, Agent, or Firm* — Dority & Manning, P.A.

(57) ABSTRACT

Photonic bandgap fibers are described that can be solid across the core and clad and have a large core diameter with little loss in the fundamental mode. In addition, the mode loss of the higher order modes can be much greater than that of the fundamental mode, providing high power fibers with high effective mode area. Excellent single mode output can be obtained from the fibers in length scale close to what is required for fiber laser and amplifiers.

25 Claims, 20 Drawing Sheets

(56) References Cited

FOREIGN PATENT DOCUMENTS

| EP | 2 228 673 A1 | 9/2010 |
|---|---|---|
| WO | WO 2006/072025 A2 | 7/2006 |

OTHER PUBLICATIONS

L. Dong—"*Advanced Specialty Fibers for Applications in Fiber Laser*", Photonics West, San Francisco, invited paper 7914-40, Jan. 22-27, 2011.

\* cited by examiner

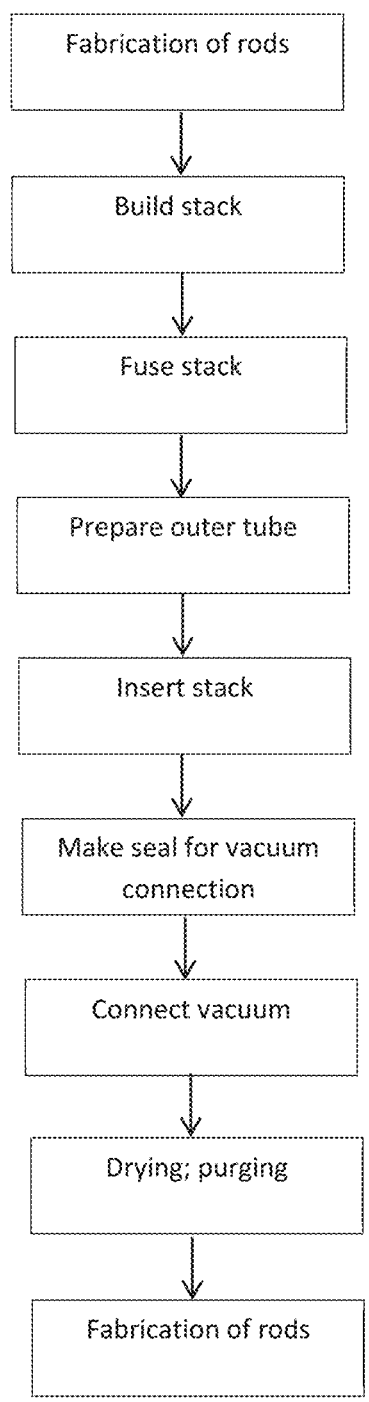
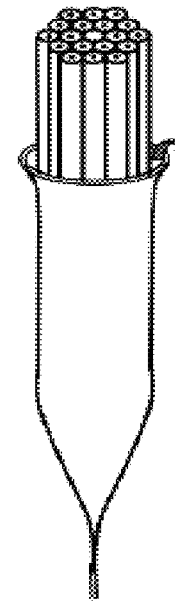
FIG. 4
FIG. 5

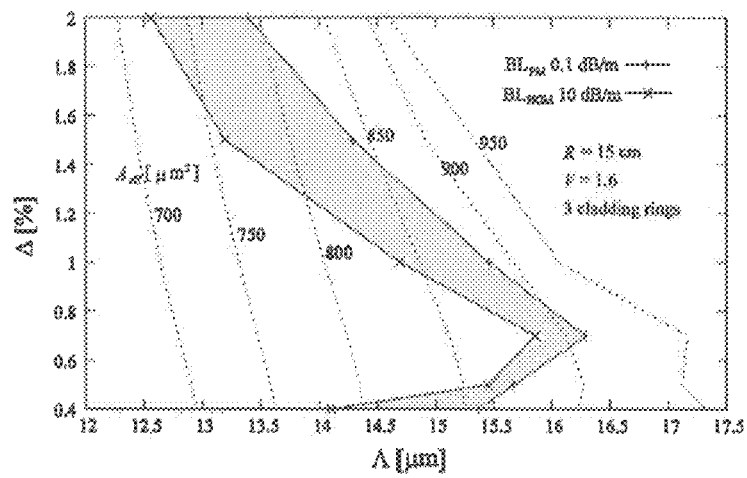
FIG. 26A
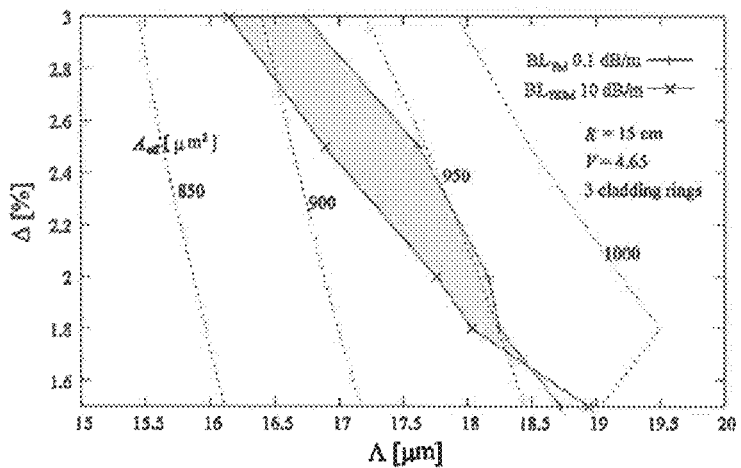
FIG. 26B
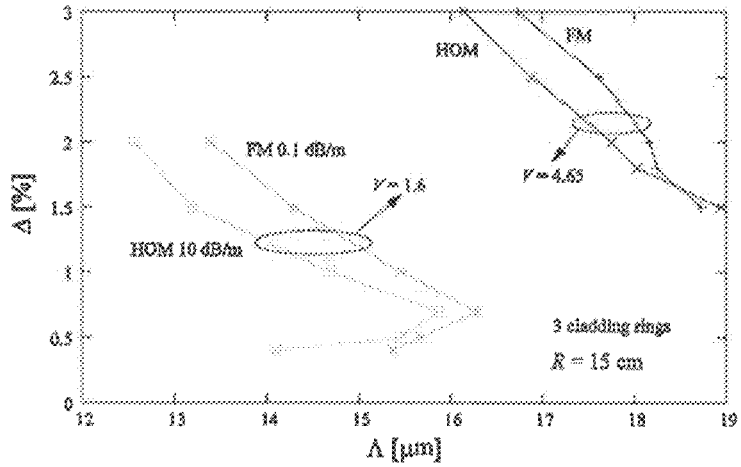
FIG. 26C
FIG. 26

FIG. 27A
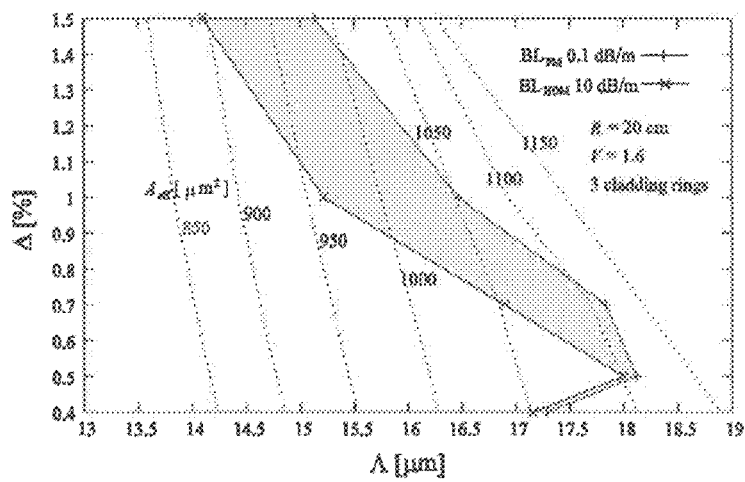
FIG. 27B
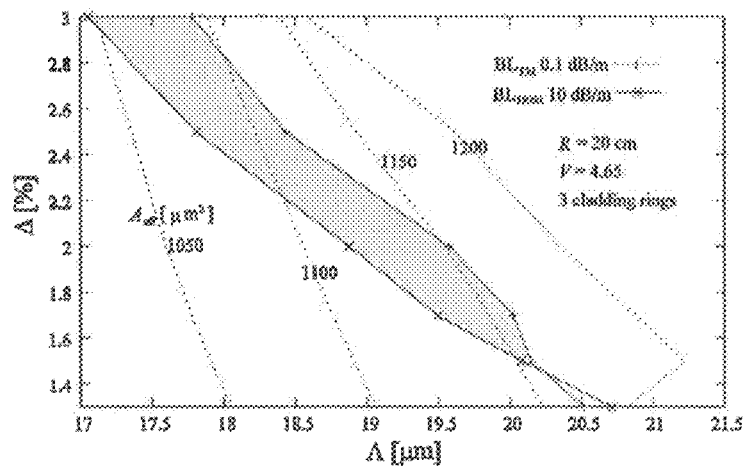
FIG. 27C
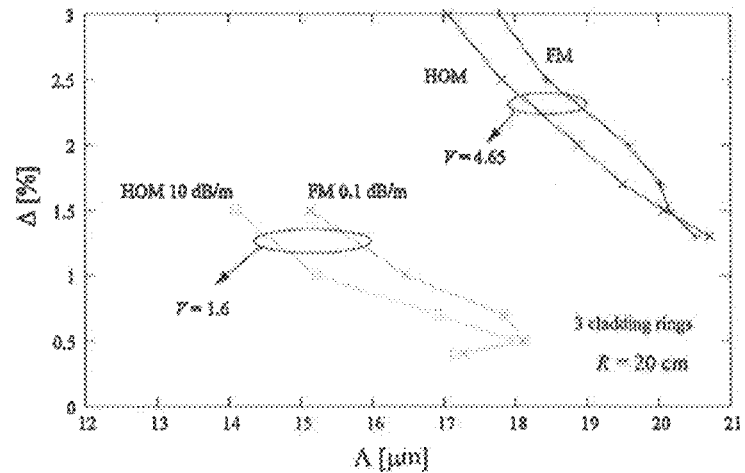
FIG. 27

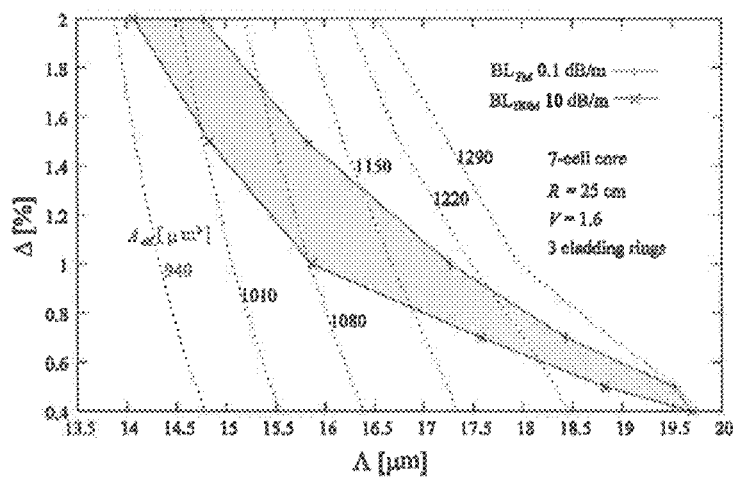
FIG. 28A
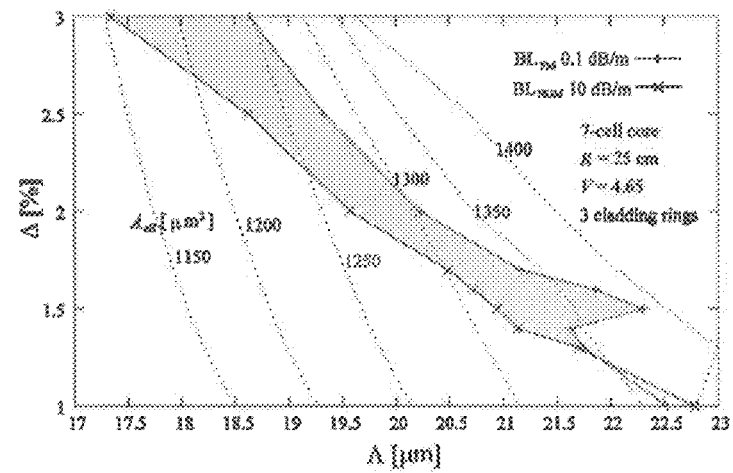
FIG. 28B
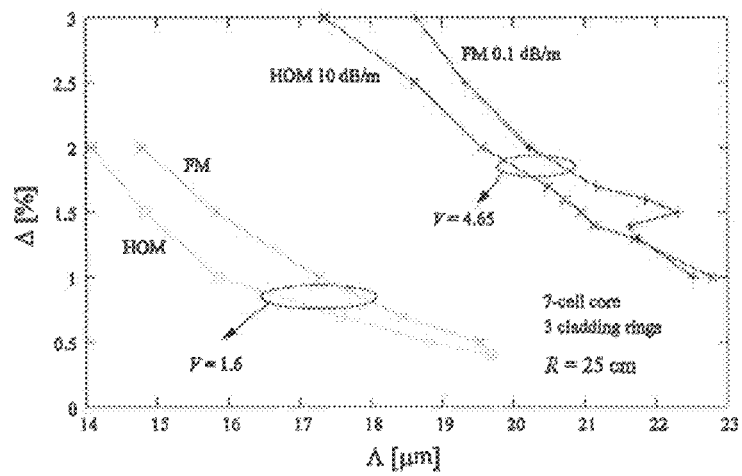
FIG. 28C
FIG. 28

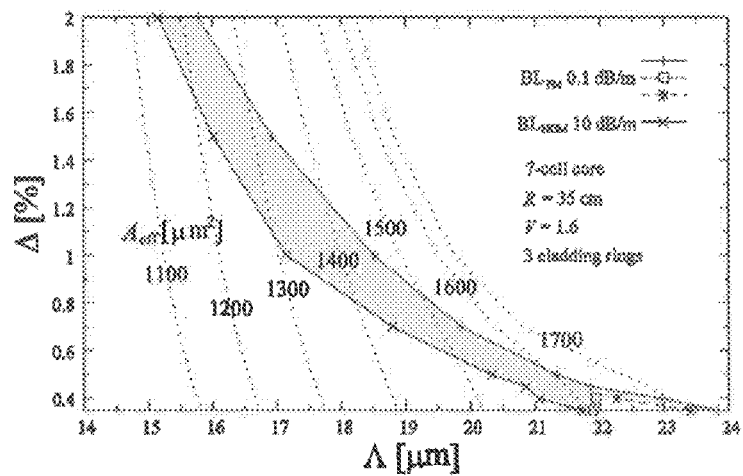
FIG. 29A
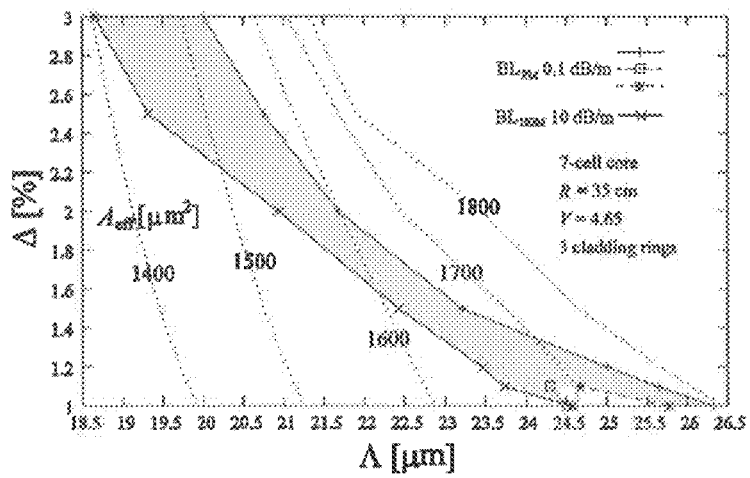
FIG. 29B
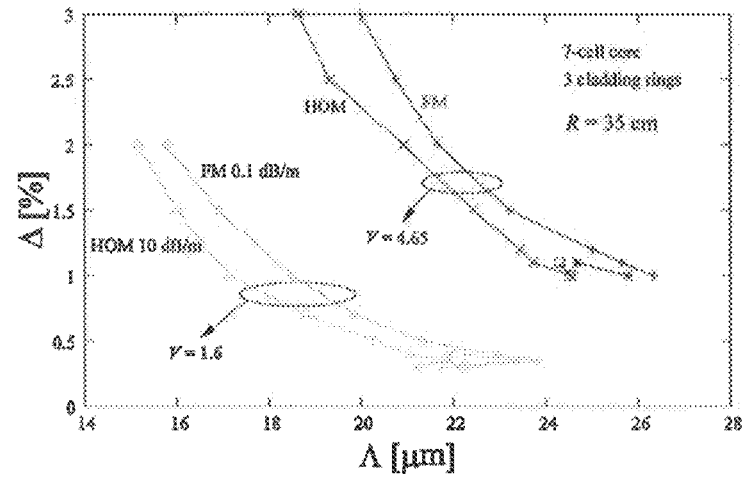
FIG. 29C
Fig.29

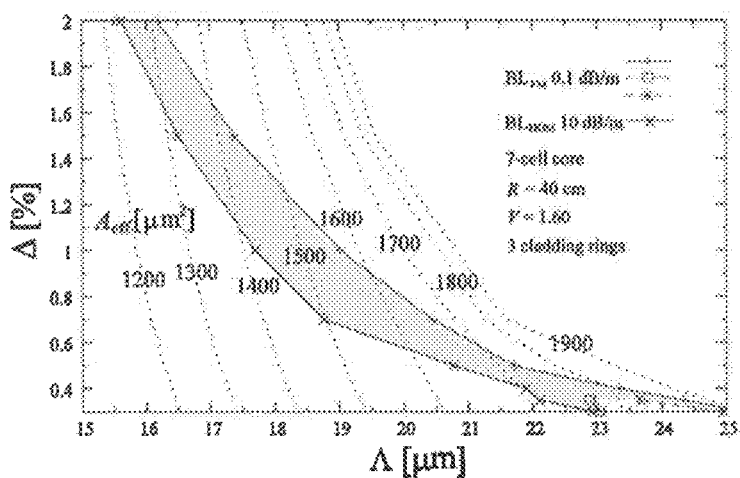
FIG. 30A
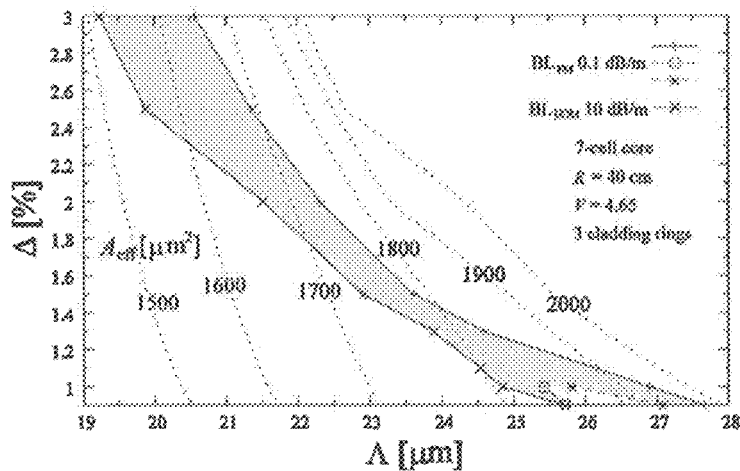
FIG. 30B
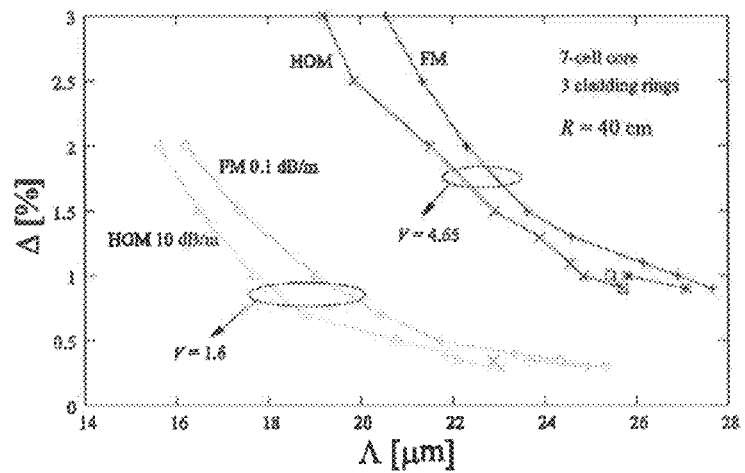
FIG. 30C
FIG.30

HIGH POWER OPTICAL FIBERS

CROSS REFERENCE TO RELATED APPLICATIONS

This application claims filing benefit of U.S. Provisional Patent Application Ser. No. 61/588,771 having a filing date of Jan. 20, 2012, which is incorporated herein in its entirety by reference.

STATEMENT REGARDING FEDERALLY SPONSORED RESEARCH OR DEVELOPMENT

This invention was made with government support under Grant/Contract No. W911 NF-10-1-0423 awarded by the U.S. Army Research Office. The government has certain rights in the invention.

BACKGROUND

Despite significant developments in fiber laser technology in recent years, there are still great needs to scale power in both continuous wave and pulsed lasers for use in a wide range of industrial, scientific and defense applications. Optical nonlinear effects, such as stimulated Brillouin scattering (SBS), stimulated Raman scattering (SRS), self-phase modulation (SPM) and Four-wave-mixing (FWM) are some of the key limiting factors in power scaling. All of these nonlinear effects could be mitigated by effective mode-area scaling of fibers while maintaining single-transverse-mode operation. Effective mode-area scaling could also lead to high pulse energy due to an increase in stored energy in the amplification process.

Although numerous techniques have been studied for the suppression of the wide range of nonlinearities, the fundamental solution to power scaling is scaling of mode areas in fibers while maintaining sufficient single mode operation. The key problem to be overcome is that fundamental physics states that more modes are supported once the physical dimensions of waveguides are increased.

Approaches that have been studied to solve this problem generally fall into three categories. The first involves reducing the numerical aperture of the waveguide. Since the number of modes supported by a waveguide is a function of both core diameter and numerical aperture, a lower numerical aperture can be used to reduce the number of guided modes. Some early approaches of mode-area scaling, photonic crystal fibers and recent triple clad approaches fall into this category. One major deficiency of these approaches is that a lower numerical aperture weakens the fundamental mode guidance and renders it very sensitive to bending and any other mechanical perturbation on the fibers. Thus, photonic crystal fibers with lower numerical apertures and over 40 μm core diameter can only be used as straight rods.

The second category includes approaches based on the introduction of differential mode losses. Here, fundamental mode guidance is strong enough to allow coiling even at large core diameters while higher order modes are eliminated by introducing higher losses for these modes. Conventional step index large mode area fibers fall into this category and differential mode loss in this case is from coiling. This approach exploits strong mode-dependent loss to mitigate the waveguide's tendency to support more modes at large core diameters. One major benefit of this approach is that strong fundamental mode guidance can be maintained to allow coiling. The major challenge is to introduce very high losses for all higher order modes at the desired wavelength while maintaining good fundamental mode transmission.

Special waveguide designs have also been developed to further increase differential mode loss. Some recent approaches rely on resonant out-coupling of higher order modes from a conventional step-index core. A low loss is ensured for the desired fundamental modes by the conventional cores. These systems are, however, limited in terms of scaling much beyond 50 μm core diameter. The higher order mode out-coupling fundamentally relies on phase-matching, typically at a different wavelength for a different mode, and spatial overlap between the modes. However, both of these aspects become major limits very quickly in a large core fiber. As such, it becomes difficult to ensure that all phase-matching conditions are met at the same desired wavelength for all relevant higher order modes when there are a number of modes in consideration. As the core diameter increases, these higher modes in the core are increasingly more confined to the core center. This leads to much less mode coupling due to a reduced spatial overlap between the coupling modes and much stronger wavelength-dependence in phase-matching. Both make these designs hard to implement, especially at large core diameters. Other approaches in this second category include leakage channel fibers. They overcome the limitations of the resonantly-coupled approach by starting with a leaky waveguide. Because modes are no longer guided in a leaky waveguide, a significant new way for optimizing differential mode loss is possible. Since these designs do not necessarily depend on any resonant effects, they are much more tolerant in the fabrication process. Due to the delocalized nature of modes, they are more scalable to much larger core diameters. Single mode operation in a core diameter of 180 μm has been demonstrated in leakage channel fibers.

The third category of approaches for mode area scaling is based on the operation of one of the higher order modes (HOM) in a highly multimode fiber. This approach works upon the premise that the propagation of a higher order mode can be very stable even in a highly multimode fiber. Moreover, these higher order modes can offer significantly better bending performance. The main deficiency of this approach is that in an active highly multimode fiber, spontaneous emission populates all modes equally by fundamental quantum mechanical principles. This can significantly limit the operation of high gain amplifiers due to strong amplified spontaneous emission (ASE) in undesired modes. While complex techniques have been proposed recently to mitigate these limits, it is hard to completely eliminate this ASE problem. Mode area scaling to 20 μm mode field diameter using all-solid photonic bandgap fibers has been reported. A detailed theoretical investigation on the limit of mode area scaling with all-solid photonic bandgap fibers indicated an upper limit of about 500 μm$^2$ using a more optimized seven-cell core and operating in the first bandgap. Recently, all-solid photonic bandgap fibers with up to about 700 μm$^2$ effective mode areas have been demonstrated operating in the first bandgap.

What are needed in the art are optical fibers that can provide high power output, such as may be used in high power lasers, and methods for forming the high power optical fibers.

SUMMARY

According to one embodiment, a photonic bandgap optical fiber is disclosed. The fiber can include a solid core having a diameter of about 40 micrometers or greater and a solid cladding including a plurality of nodes that surrounds the core. Each node of the solid cladding can be surrounded in the cross sectional direction of the fiber by a background material. The refractive index of at least a portion of the nodes can be greater than the refractive index of the background material. The nodes can be arranged with respect to one another so as to form a cladding lattice. The photonic bandgap fiber can have a loss in a fundamental mode of about 1 decibel per meter or less and can have a loss in higher order modes of about 5 decibel per meter or greater.

Also disclosed is a method for forming a photonic bandgap fiber. For example, a method can include arranging a plurality of rods to form a stack, the plurality of rods including multiple core rods and multiple clad rods. At least a portion of the clad rods can include a background area and a node area. The multiple core rods can form a core of the stack and the clad rods can surround the stack core in the cross sectional dimension of the stack. The node areas can be arranged in the stack with respect to one another so as to form a stack cladding lattice. The method can also include drawing the stack to form the photonic bandgap fiber.

BRIEF DESCRIPTION OF THE DRAWINGS

A full and enabling disclosure, including the best mode thereof, to one of ordinary skill in the art, is set forth more particularly in the remainder of the specification, including reference to the accompanying Figures, in which:

FIG. 4 is a flow diagram of a method for forming an optical fiber as described herein.

FIG. 5 illustrates the drawing of a stack to form an optical fiber as described herein.

FIG. 26A presents a design regime satisfying bending loss for the fundamental mode of less than 0.1 dB/m and the higher order mode of larger than 10 dB/m for fibers at a bending radius of 15 cm and a normalized frequency of 1.6.

FIG. 26B presents a design regime satisfying bending loss for the fundamental mode of less than 0.1 dB/m and the higher order mode of larger than 10 dB/m for fibers at a bending radius of 15 cm and a normalized frequency of 4.65.

FIG. 26C compares the results shown in FIG. 26A and FIG. 26B.

FIG. 27A presents a design regime satisfying bending loss for the fundamental mode of less than 0.1 dB/m and the higher order mode of larger than 10 dB/m for fibers at a bending radius of 20 cm and a normalized frequency of 1.6.

FIG. 27B presents the design regime satisfying bending loss for the fundamental mode of less than 0.1 dB/m and the higher order mode of larger than 10 dB/m for fibers at a bending radius of 20 cm and a normalized frequency of 4.65.

FIG. 27C compares the results shown in FIG. 27A and FIG. 27B.

FIG. 28A presents a design regime satisfying bending loss for the fundamental mode of less than 0.1 dB/m and the higher order mode of larger than 10 dB/m for fibers at a bending radius of 25 cm and a normalized frequency of 1.6.

FIG. 28B presents a design regime satisfying bending loss for the fundamental mode of less than 0.1 dB/m and the higher order mode of larger than 10 dB/m for fibers at a bending radius of 25 cm and a normalized frequency of 4.65.

FIG. 28C compares the results shown in FIG. 28A and FIG. 28B.

FIG. 29A presents a design regime satisfying bending loss for the fundamental mode of less than 0.1 dB/m and the higher order mode of larger than 10 dB/m for fibers at a bending radius of 35 cm and a normalized frequency of 1.6.

FIG. 29B presents a design regime satisfying bending loss for the fundamental mode of less than 0.1 dB/m and the higher order mode of larger than 10 dB/m for fibers at a bending radius of 35 cm and a normalized frequency of 4.65.

FIG. 29C compares the results shown in FIG. 29A and FIG. 29B.

FIG. 30A presents a design regime satisfying bending loss for the fundamental mode of less than 0.1 dB/m and the higher order mode of larger than 10 dB/m for fibers at a bending radius of 40 cm and a normalized frequency of 1.6.

FIG. 30B presents a design regime satisfying bending loss for the fundamental mode of less than 0.1 dB/m and the higher order mode of larger than 10 dB/m for fibers at a bending radius of 40 cm and a normalized frequency of 4.65.

FIG. 30C compares the results shown in FIG. 30A and FIG. 30B.

DETAILED DESCRIPTION

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to the present disclosure without departing from the scope or spirit of the disclosure. For instance, features illustrated or described as part of one embodiment, may be used in another embodiment to yield a still further embodiment. Thus, it is intended that the present disclosure cover such modifications and variations as come within the scope of the appended claims and their equivalents.

The present disclosure is generally directed to photonic bandgap fibers. More specifically, the photonic bandgap fibers can be solid across the core and clad and have a large core diameter with little loss in the fundamental mode. In addition, the mode loss of the higher order modes can be much greater than that of the fundamental mode, providing high power fibers with high effective mode area. The high level of higher order mode suppression can provide many benefits to the high power fibers. For example, excellent single mode output can be obtained from these fibers in length scale close to what is required for fiber laser and amplifiers. Moreover, these fibers can provide high power single mode output at a wide range of bending radii. For instance, the fibers can provide high power with low loss at bending radii of less than about 50 centimeters (cm). For instance, the photonic bandgap fibers can provide a single mode output at high power and low loss at a bending radius of about 5 cm, about 10 cm, about 15 cm, about 20 cm, about 25 cm, about 30 cm, about 35 cm, about 40 cm, or higher.

Figure 1:
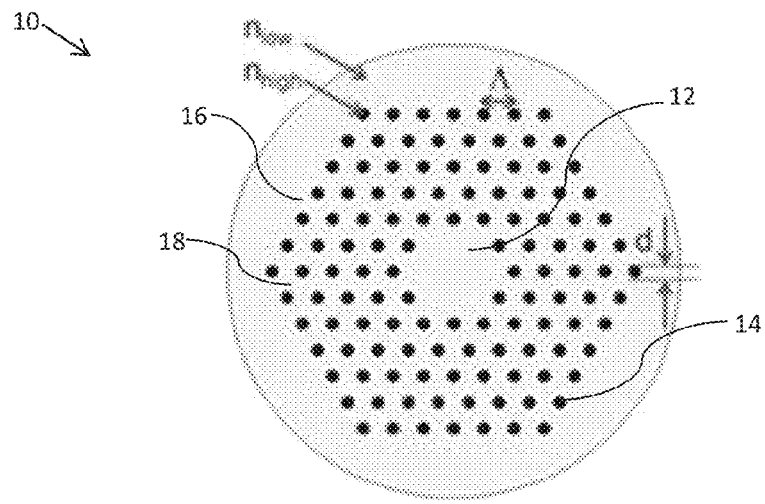
FIG. 1 is a cross sectional view of one embodiment of an optical fiber as described herein.

FIG. 1 schematically illustrates one embodiment of a photonic bandgap fiber as described herein. The fiber 10 includes a solid core 12 and a solid cladding 16. The solid cladding 16 includes a number of nodes 14 surrounded by a background glass 18 that form a cladding lattice. As is known, a mode is guided only when it falls within the photonic bandgap of the cladding lattice of a solid photonic bandgap fiber. The photonic bandgap effect of the cladding lattice, i.e. anti-resonant effects of the cladding lattice, guides light in the core of the fiber.

The disclosed fibers utilize designs that support the fundamental mode, i.e. selective mode guidance versus selective elimination of mode guidance as in some other approaches. As in conventional fibers, the effective indices of the core modes are just slightly below the core index. The guided modes in the defect core only exist within the cladding bandgaps, which determine the wavelength range over which the modes in the core are guided. This photonic bandgap guidance can be strongly mode-dependent. The large core photonic bandgap fibers can maximize guidance of the fundamental mode while minimizing the guidance of all higher order modes, equivalent to the use of mode dependent leakage losses.

As stated, the photonic bandgap fibers can have a large core, for instance about 40 micrometers or greater, or about 50 micrometers or greater, for instance between about 40 micrometers and about 150 micrometers in one embodiment. The effective mode area of the photonic bandgap fibers can be greater than about 500 μm$^2$, greater than about 700 μm$^2$, or greater than about 2000 μm$^2$ and the fibers can deliver much higher power as compared to other single-mode fibers, for instance about 10, about 20, about 30, or even higher times the power of other single-mode fibers as have been known in the art without reaching the non-linear threshold.

The large core fibers can exhibit low losses in the fundamental mode, for instance about 1 decibel per meter (dB/m) or less, about 0.1 dB/m or less, or about 0.01 dB/m or less, and the losses in the higher order modes (e.g., the second mode) can be about 5 dB/m or greater, or about 10 dB/m or greater. For example, the measured higher order mode power can be less than about −20 dB, or less than about −30 dB below that of fundamental mode in the fibers. The ratio of the loss of the higher order modes (e.g., the second mode) to that of the fundamental mode can generally be at least 1 order of magnitude or even higher in other embodiments. For instance, the ratio of the loss of the second order mode to that of the fundamental mode can be 2 orders of magnitude, 3 orders of magnitude, 4 orders of magnitude, or higher.

As illustrated in FIG. 1, the cladding 16 can be defined by node diameter d, pitch Λ (the center to center distance between nodes), node refractive index $n_h$ and background refractive index $n_l$. In the past, further mode area scaling has been limited by the strong guidance in the first bandgap at the large pitch required for larger cores, for instance core diameter 2ρ is 4Λ-d for a seven-cell core. The ratio of d/Λ can generally be greater than about 0.2, for instance between about 0.2 and about 0.8, or between about 0.3 and about 0.5, in one embodiment. Higher order bandgaps are usually associated with shallower bandgaps, and, consequently, this enables large core diameters. It can, therefore, be preferable in one embodiment to operate in the higher order bandgaps. For instance, the fiber can operate in the second bandgap, third bandgap, fourth bandgap, or higher bandgaps.

The values for the node diameter d and the pitch Λ can vary. For example, when considering a 7 cell core, a preform stack of which is illustrated in FIG. 2, the node diameter can be from about 4 μm to about 20 μm, or from about 5 μm to about 10 μm, and the pitch can generally be from about 5 μm to about 60 μm, from about 10 μm to about 30 μm, or from about 14 μm to about 17 μm.

Figure 2:
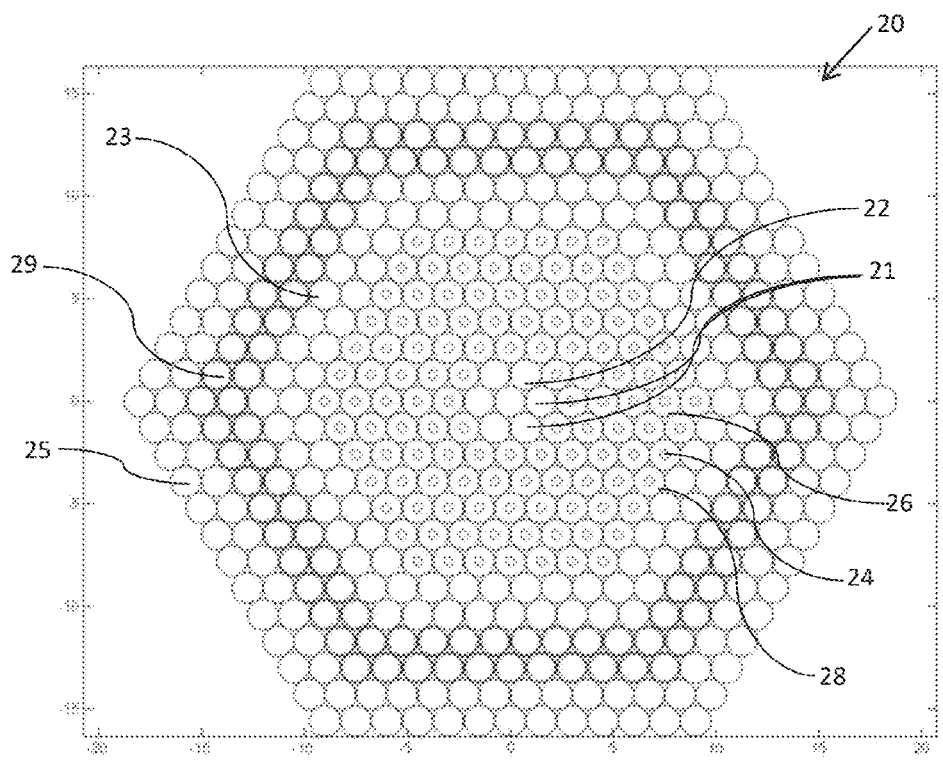
FIG. 2 illustrates a preform stack as may be utilized in forming an optical fiber as described herein.

The photonic bandgap fibers can be formed from a plurality of individual rods that are stacked together to form a preform stack 20 as illustrated in FIG. 2, each individual rod constituting a cell. In this embodiment, the stack core 22 is a seven cell core. It should be understood, however, that the core is not limited to a seven cell core, and the core can be formed of any suitable number of cells.

The seven individual rods 21 that form the stack core 22 can be formed of materials as are generally known in the art for formation of optical fibers. For example, the stack core 22 can be formed of seven silica ($SiO_2$) rods 21 arranged as shown in FIG. 2. Examples of core materials can include, without limitation, oxides of silicon, germanium, aluminum, boron, phosphorus, titanium, alkali- and alkali-earth metals as well as similar glasses doped with fluorine or chlorine. Furthermore, the core material can also include one or more dopant materials, such as Chromium (Cr), Nickel (Ni), selected rare earth elements, transition metals, and so forth. In one embodiment, the core can be homogeneous, i.e., the same material can be present throughout the entire core, with no areas of the core having different materials (e.g., high dopant concentrations) or other features that could differentiate one area of the core from another. In this embodiment, the individual rods forming the core will all be homogeneous and identical to one another.

In one embodiment, the rods 21 forming the stack core 22 can include one or more laser active ion dopants. Such dopants can absorb pump light, typically at a shorter wavelength than the laser or amplifier wavelength (except in upconversion lasers), which excites them into some metastable levels. This allows for light amplification via stimulated emission. Laser active ion dopants as may be incorporated into the rods 21 forming the stack core 22 can include, for example, neodymium, ytterbium, erbium, thulium, praseodymium, and holmium, or combinations of these dopants. In one embodiment, the refractive index of the core can be from about $-5\times10^{-4}$ to about $+1\times10^{-4}$ of the refractive index of the background area $n_b$.

The stack clad 14 can be formed of rods, in this embodiment each of which includes a peripheral background 28 and a node 24. The nodes together form the stack cladding lattice, which can be formed of multiple layers. For instance, in the embodiment of FIG. 2, the stack cladding lattice is formed of 5 node layers. This is not a requirement, however, and the number of node layers in the cladding lattice can vary, for instance from 1 to about 10. The nodes of the stack cladding lattice can be arranged in any two-dimensional pattern in the cross sectional dimension of the preform (and as such the fiber as well) such as a linear pattern, a triangular lattice pattern, a honeycomb lattice pattern, a square lattice pattern, or a rectangular pattern structure. The rods of the stack clad 14 can be arranged such that the stack clad 14 is in the shape of a circle or a polygon, for instance as a triangle or as a hexagon as illustrated in FIG. 2.

Figure 3A:
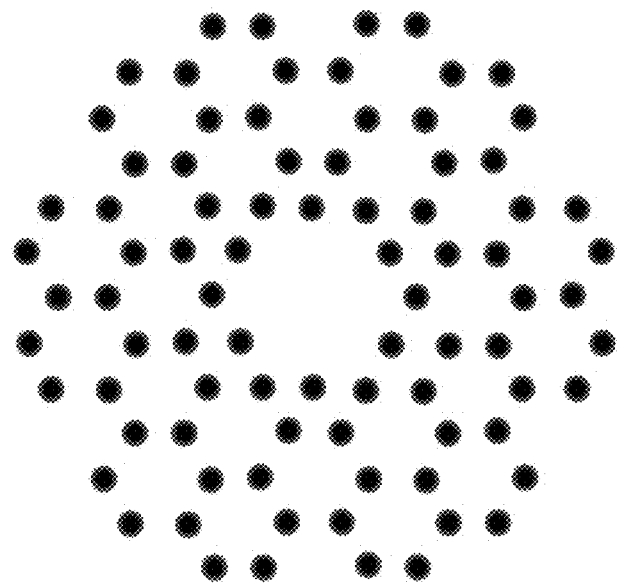
FIG. 3A and FIG. 3B present examples of node arrangements for an optical fiber as described herein.
Figure 3B:
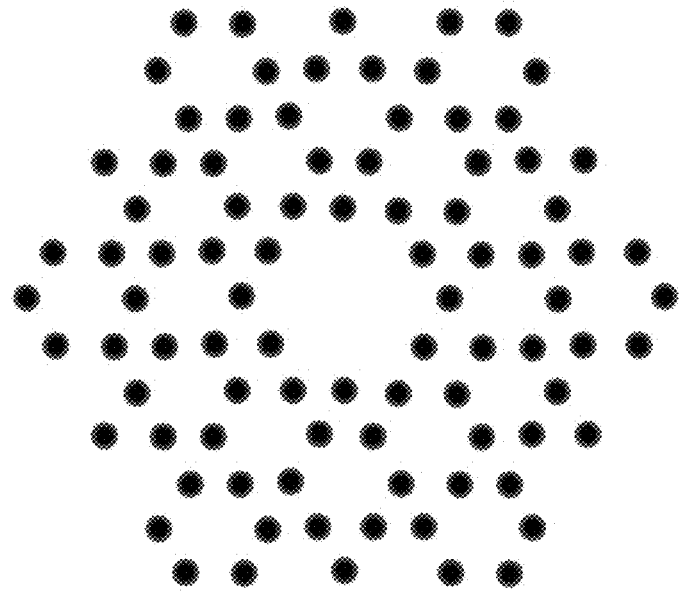

It should be understood that the nodes do not need to be arranged with identical pitch between all nodes. For example, as illustrated in FIG. 3A and FIG. 3B, it may be desired in some embodiments to form a cladding with a variety of spacing between nodes, e.g., smaller spacing (minimum pitch) between selected nodes and larger spacing (maximum pitch) between selected nodes, with other pitch widths in between, if desired, so as to form a cladding lattice having an open cladding design that can maximize higher order modes losses. More than two spacings (e.g. multiple pitches) between nodes are also encompassed herein. The larger spaces in such a cladding are generally smaller than the core dimension, so as to minimize fundamental mode loss and to avoid additional cores. Photonic bandgaps exist in such cladding designs, embodiments of which are illustrated in FIG. 3A and FIG. 3B.

The individual nodes of a cladding lattice do not need to have the same dimensions as one another. For example, nodes can be designed to fall into a combination of bandgaps. By way of example, certain nodes can be designed to operate in the $1^{st}$ bandgap and others in the $3^{rd}$ bandgap. In addition, the refractive indices of all of the nodes need not be equivalent to one another. For example, nodes with refractive index lower than $n_b$ may be used at selected nodes, with other nodes at a refractive index that is higher than $n_b$.

Referring again to FIG. 1, the background 18 and the nodes 14 can include the same basic material, e.g., silica, as the core 12, or can be formed of different materials. In addition, the refractive index of the background 18 ($n_b$) can be the same or slightly greater or lower than the refractive index of the core 12. Thus, in one embodiment, the background 18 and the core 12 can be formed of the same material. In another embodiment, the background 18 and/or the core 12 can include as dopant a material that increases or decreases the refractive index of the core 12 as compared to that of the background 18. Moreover, as discussed above, the core 12 can include an active dopant that is not present in the background 18.

At least a portion of the nodes 14 can have a higher refractive index as compared to the background 18. Dopants as are generally known can be utilized to control the optical indices of the core 12, background 18, and nodes 14. For instance, germanium, phosphorous, and titanium cause an increase in refractive index (decrease in light velocity), while boron and fluorine cause a decrease in refractive index (increase in light velocity). Thus, and depending upon the final characteristics desired for the optical fiber, the nodes 14 can be doped with an amount of a material, e.g., germanium oxide ($GeO_2$) that can increase the refractive index of the nodes 14 as compared to the background 18. For instance, the nodes 14 can be germanosilicate ($GeO_2/SiO_2$) as is known in the art.

The relationship between the refractive index of the nodes 14 and the background 18 can be described by the relative node index, Δ, which is defined as $$\Delta(\%)=((n_h^2-n_b^2)/(2n_h^2))\times 100$$

The relative node index, Δ, can generally be between about 0.5% and about 5%, for instance between about 1% and about 4%. (In those embodiments in which the nodes are not all identical to one another, $n_h$ refers to the highest refractive index material of the nodes).

The normalized frequency of the node, V, can be determined according to the relationship:

$$V=(\pi d/\lambda)(n_h^2-n_b^2)^{1/2}$$

in which d, $n_n$, and $n_b$ are as described above and λ is the operating wavelength. In general, the normalized frequency can be between about 1 and about 10.

The photonic bandgap fiber can include additional areas, external to the core 12 and clad 16. In the embodiment illustrated in FIG. 2, the preform stack 20 includes buffer zones 23, 25 that can be formed of, e.g., silica glass. In one embodiment, the buffer zone 23 can be formed of the same material as the background 28. Buffer zones 23, 25 can be formed of the same materials as one another or different materials, as desired.

The preform stack 20 also includes a pump cladding 29. A double clad design including the pump cladding 29 can be utilized to incorporate a pump guide around the stack core 22. During use, pump energy can be injected into the pump guide to pump active ions in a fiber core formed from stack core 22. The pump cladding 29 can have an effective lower refractive index as compared to the background 28 that can be developed either by using, e.g., a low index fluorine-doped silica glass or air-hole structures comprising of mainly air and a small amount of a glass. In case of using air hole structures to form the pump cladding, the buffer layer 25 external to the pump cladding 29 may be used to provide structural support. A polymer coating (not shown in FIG. 2) may be used as the outermost layer to provide further protection. In one embodiment, the buffer layer 25 and pump cladding 28 can be replaced with a single layer of low index polymer.

The flow chart of FIG. 4 provides one route for forming the photonic bandgap fibers. Initially, the individual rods can be formed. For instance, the rods can be formed by use of one or more chemical vapor deposition techniques including, without limitation, inside chemical vapor deposition (ICVD), outside chemical vapor deposition (OCVD), modified chemical vapor deposition (MCVD), plasma-activated chemical vapor deposition (PACVD), furnace-assisted chemical vapor deposition (FACVD), axial vapor phase axial deposition (VAD), or a combination of techniques. Such techniques can be particularly useful when forming the clad rods that include both a node area and a background area.

Following formation, the rods can be arranged in the desired geometry to build the stack of the preform, for instance a preform stack 20 as illustrated in FIG. 2. The formed stack can then be fused. For instance, the stack can be placed into a heating furnace and heated to fuse the rods and form a cane. In one embodiment, an outer cylinder can be prepared, for instance an outer cylinder formed of silica glass, and the fused stack can be inserted in the outer cylinder. This is not a requirement, however, and in other embodiments the fused stack is not inserted into an outer cylinder. The cylinder can be sealed, for instance with caps mounted at both ends for the vacuum connection. A vacuum can then be connected so as to dry and purge the fused preform, and the fiber can be drawn. In one alternative embodiment, multiple canes (for instance from a few millimeters to a few centimeters in diameter) can be individually drawn, and the multiple canes can then be assembled and subsequently drawn together to form a fiber.

The preform can be drawn into an optical fiber according to standard methodology, such as via a fiber drawing tower that includes a hot zone. The hot zone can apply heat that is sufficient to soften the clad, core, and any other sections of the preform, including any surrounding outer cylinder. Temperatures for the hot zone during a drawing process can depend upon materials included in the preform, the size of the preform and the targeted size for the fiber, as is known. For example, the draw temperature at which the core and the clad are at a viscosity to provide an acceptable draw can be between about 1500° C. and about 2200° C., for instance between about 1925° C. and about 2050° C., in one embodiment.

In general, the draw can be carried out under an inert atmosphere. As can be seen in FIG. 5, the preform can be drawn from a first end to form the optical fiber that can then be collected, for instance on a mandrel.

The robust optical guidance and physical constructs of the photonic bandgap fibers enable them to be made and used much like conventional fibers. Double-clad designs and polarization-maintaining can be added with ease. Transmission can be made with strong wavelength-dependence in these fibers for use in SRS suppression, accomplished by introducing strong loss at the Raman Stoke wavelength, in FWM suppression by providing appropriate dispersion, and in lasers at wavelengths normally dominated by much stronger transitions. The photonic bandgap fibers can provide significant higher order mode suppression, which is critical for further power scaling of single mode fiber lasers to beyond kW levels. The robust fibers can be utilized with essentially maintenance-free operation in a compact arrangement. In addition, the fibers can provide excellent beam quality and heat dissipation in an efficient operation in which both the pump and the laser can be guided.

The high power single mode fibers can be utilized in a wide variety of applications and systems. By way of example, and without limitation, the fibers can be utilized in marking applications; in cutting and welding systems such as in the automotive and ship building industry; in biomedical systems, for instance in systems for use in eye surgeries (e.g., lasik surgery) and in diagnosis; in micro-machining systems, for instance in fuel injectors and jet turbines; and in defense and security systems, for instance in sensing as well as for use in a direct energy weapon application.

The present disclosure may be further understood with reference to the examples, below.

Example 1

Fundamental mode (FM) and second order mode (referred to as HOM) losses versus normalized frequency V over the third bandgap were simulated for several fibers using a Finite Element Method (FEM) mode solver developed at Hokkaido University. The fibers had the following characteristics:

Λ=13.0 µm, 13.5 µm, 14.0 µm, 14.5 µm, 15.0 µm, 15.5 µm, 16.0 µm, 16.5 µm, 17.0 µm, and 17.5 µm;

Δ=0.5%, 1.0%, 1.5%, 2.0%, 2.5% and 3.0%;

at λ=1050 nm;

bend radius R=15 cm;

and number of cladding layers N=5 or N=4.

Figure 6:
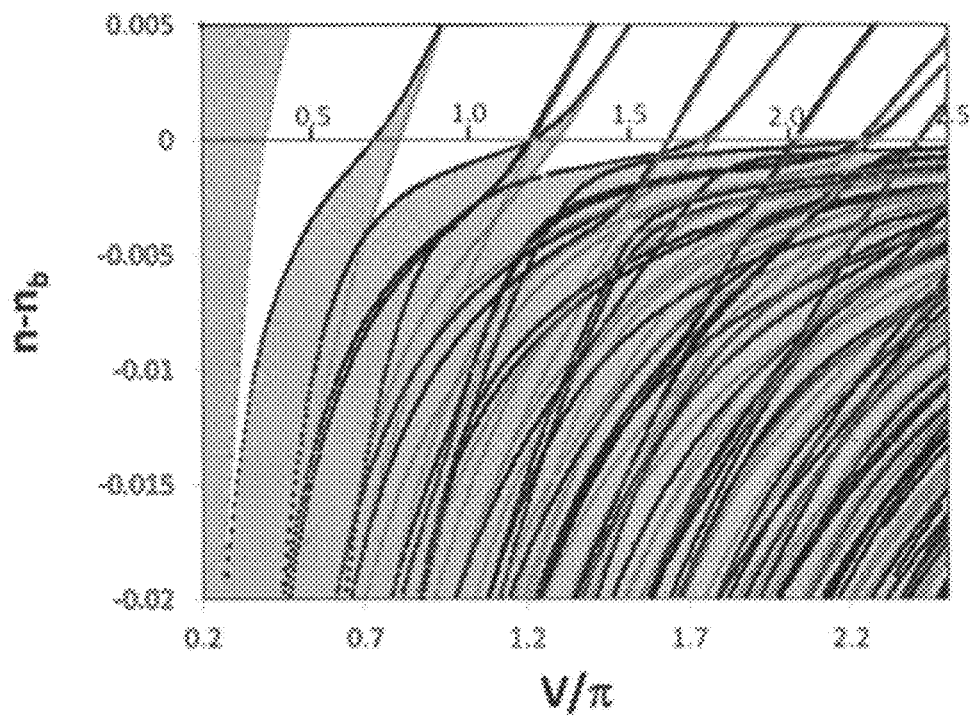
FIG. 6 illustrates the photonic bandgaps of a cladding lattice of an optical fiber.

The bandgaps in the cladding are illustrated as the white areas in FIG. 6 in which the horizontal axis is the normalized frequency of the node, Λ/π, and the vertical axis modal index minus $n_b$.

Figure 7:
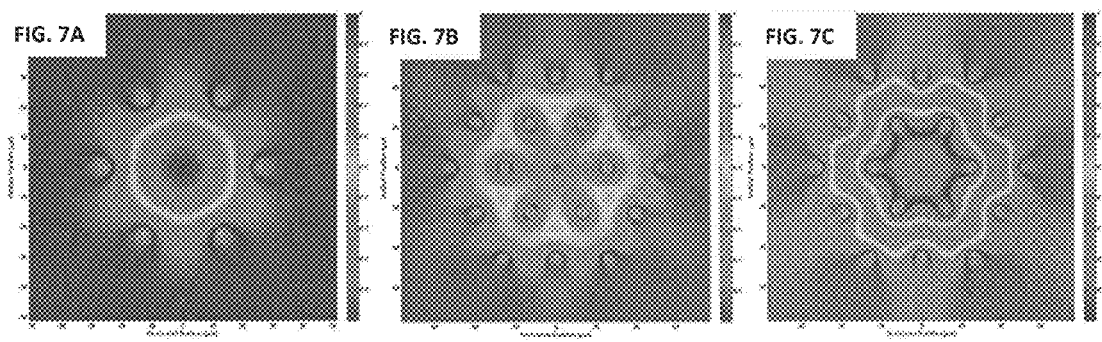
FIG. 7 illustrates the fundamental (FIG. 7A), the second (FIG. 7B) and the third (FIG. 7C) modes in the first bandgap of a 50 micrometer core of a solid photonic bandgap fiber.
Figure 8:
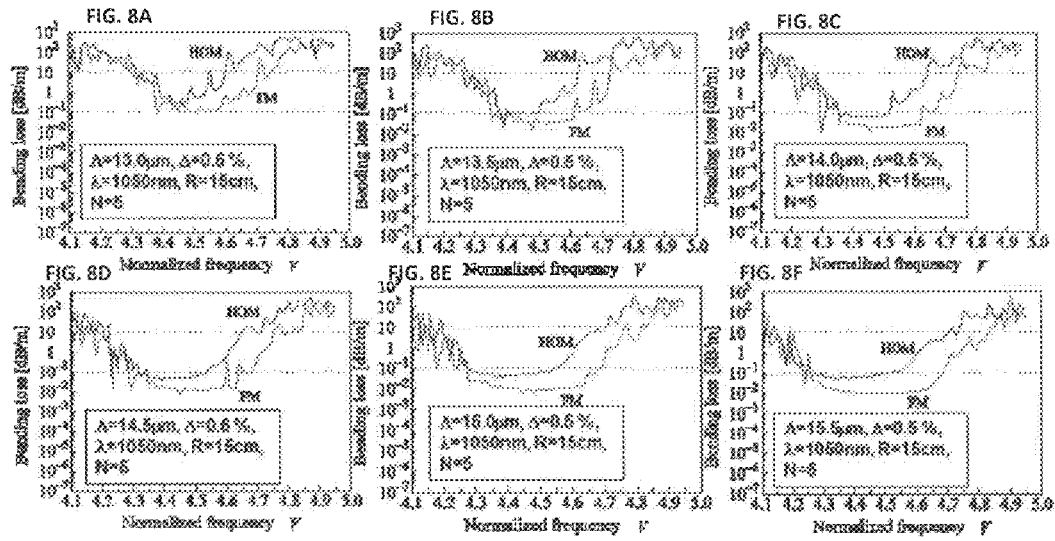
FIG. 8 illustrates the simulated fundamental and second order mode losses versus the normalized frequency over the third bandgap for optical fibers at a relative node index ($\Delta = (n_h^2 - n_b^2)/(2n_h^2)$) of 0.5% for various periodicities including 13.0 μm (FIG. 8A), 13.5 μm (FIG. 8B), 14.0 μm (FIG. 8C), 14.5 μm (FIG. 8D), 15.0 μm (FIG. 8E), and 15.5 μm (FIG. 8F).
Figure 9:
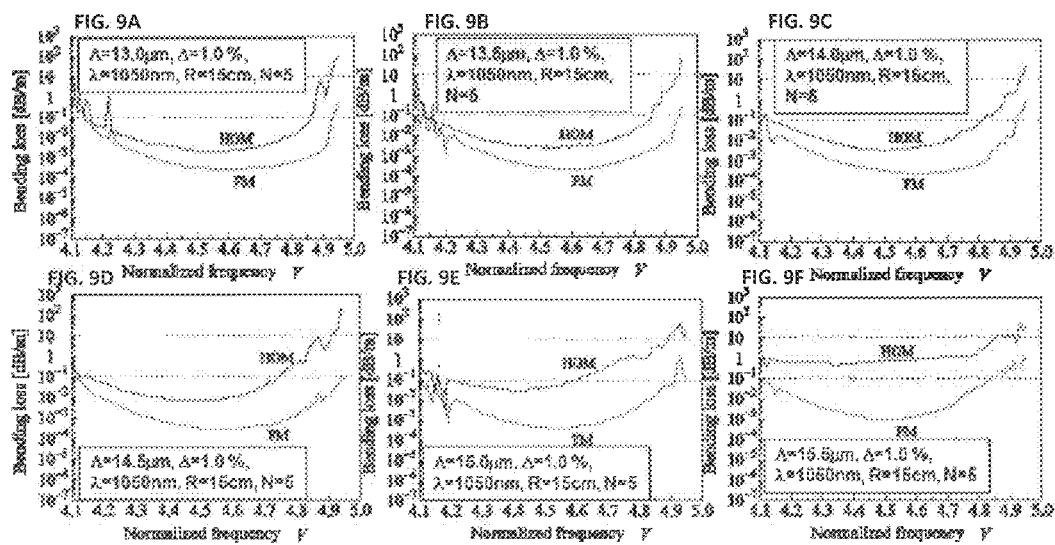
FIG. 9 illustrates the simulated fundamental and second order mode losses versus the normalized frequency over the third bandgap for optical fibers at Δ=1.0% for various periodicities including 13.0 μm (FIG. 9A), 13.5 μm (FIG. 9B), 14.0 μm (FIG. 9C), 14.5 μm (FIG. 9D), 15.0 μm (FIG. 9E), and 15.5 μm (FIG. 9F).
Figure 10:
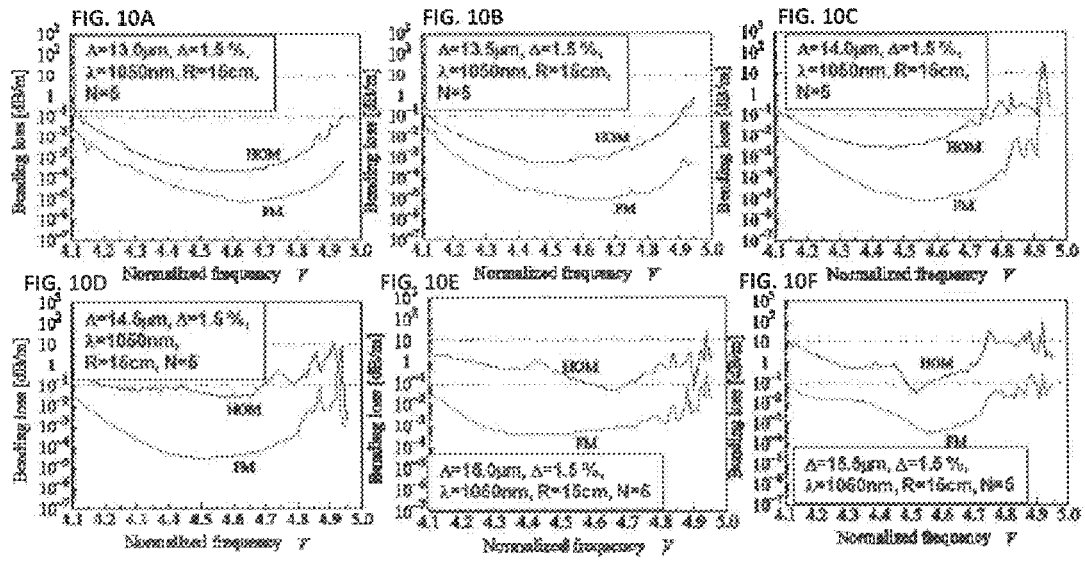
FIG. 10 illustrates the simulated fundamental and second order mode losses versus the normalized frequency over the third bandgap for optical fibers at Δ=1.5% for various periodicities including 13.0 μm (FIG. 10A), 13.5 μm (FIG. 10B), 14.0 μm (FIG. 10C), 14.5 μm (FIG. 10D), 15.0 μm (FIG. 10E), and 15.5 μm (FIG. 10F).
Figure 11:
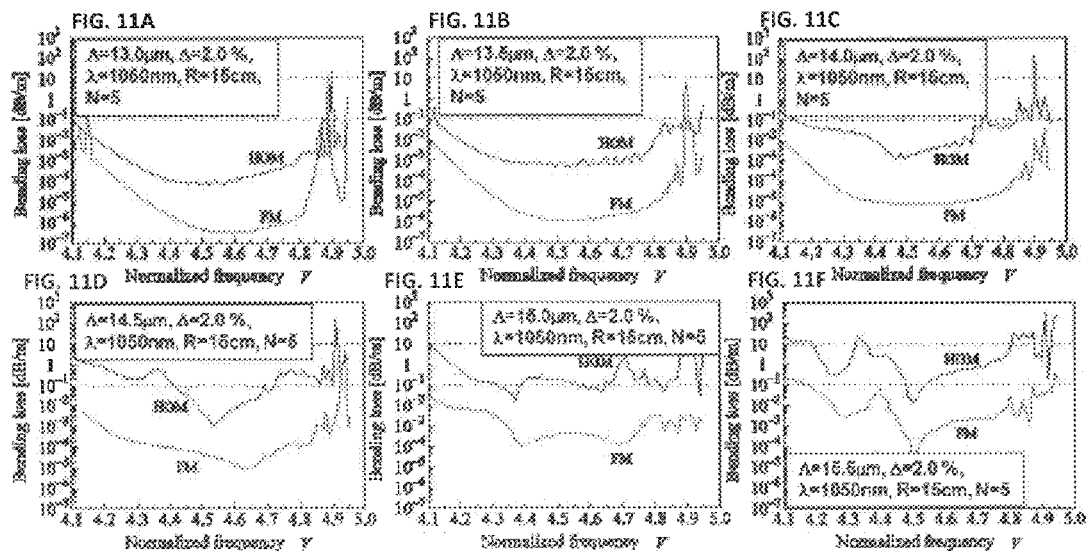
FIG. 11 illustrates the simulated fundamental and second order mode losses versus the normalized frequency over the third bandgap for optical fibers at Δ=2.0% for various periodicities including 13.0 μm (FIG. 11A), 13.5 μm (FIG. 11B), 14.0 μm (FIG. 11C), 14.5 μm (FIG. 11D), 15.0 μm (FIG. 11E), and 15.5 μm (FIG. 11F).
Figure 12:
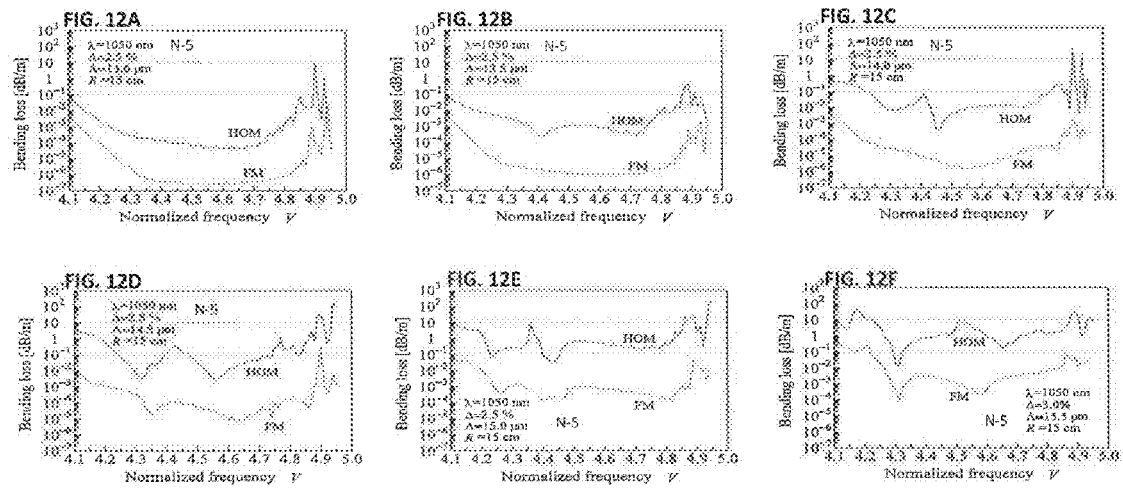
FIG. 12 illustrates the simulated fundamental and second order mode losses versus the normalized frequency over the third bandgap for optical fibers at Δ=2.5% for various periodicities including 13.0 μm (FIG. 12A), 13.5 μm (FIG. 12B), 14.0 μm (FIG. 12C), 14.5 μm (FIG. 12D), 15.0 μm (FIG. 12E), and 15.5 μm (FIG. 12F).
Figure 13:
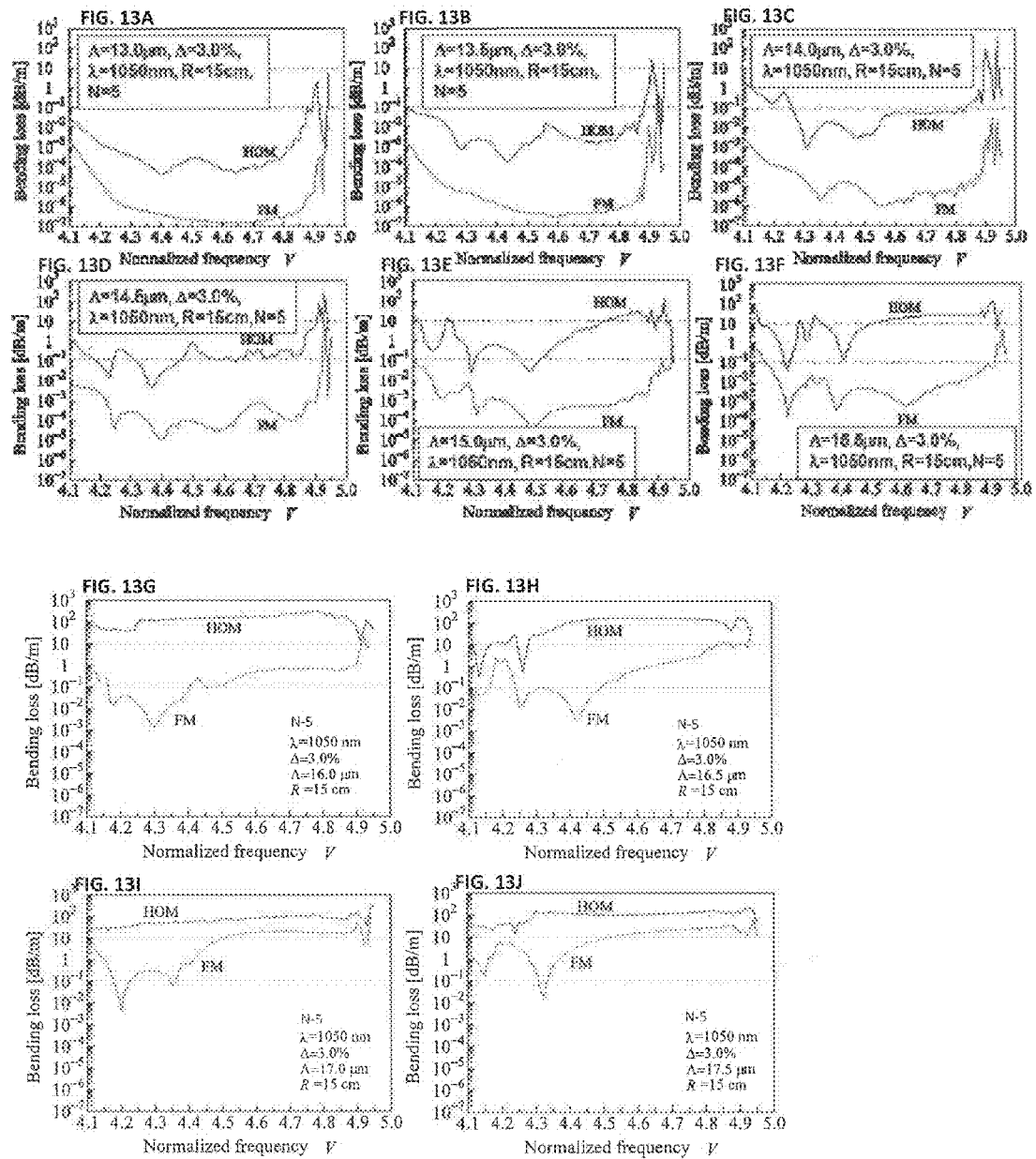
FIG. 13 illustrates the simulated fundamental and second order mode losses versus the normalized frequency over the third bandgap for optical fibers at Δ=3.0% for various periodicities including 13.0 μm (FIG. 13A), 13.5 μm (FIG. 13B), 14.0 μm (FIG. 13C), 14.5 μm (FIG. 13D), 15.0 μm (FIG. 13E), 15.5 μm (FIG. 13F), 16.0 μm (FIG. 13G), 16.5 μm (FIG. 13H), 17.0 μm (FIGS. 13I), and 17.5 μm (FIG. 13J).
Figure 14:
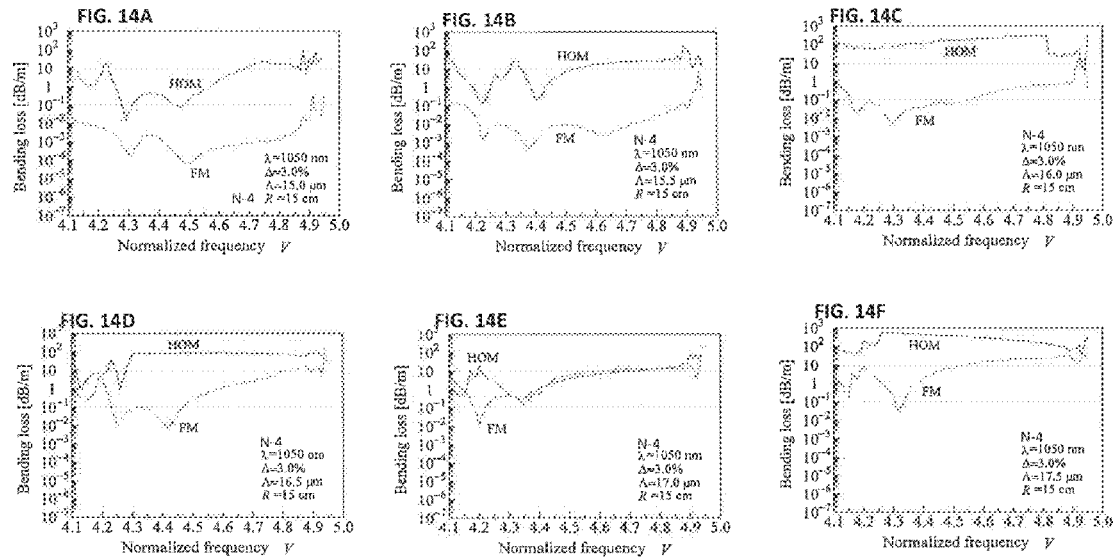
FIG. 14 illustrates the simulated fundamental and second order mode losses versus the normalized frequency over the third bandgap for optical fibers at Δ=3.0%, N-4, for various periodicities including 15.0 μm (FIG. 14A), 15.5 μm (FIG. 14B), 16.0 μm (FIG. 14C), 16.5 μm (FIG. 14D), 17.0 μm (FIG. 14E), and 17.5 μm (FIG. 14F).

The first three modes in the first bandgap of a photonic bandgap fiber with 50 µm core are illustrated in FIG. 7, showing strong guidance of fundamental mode and weakly guided higher order modes.

The results of the simulations are shown in FIGS. 8-14. All other higher order modes had much higher losses and were not plotted. Node diameter d was varied to adjust V while all other parameters remained constant for each curve. As can be seen, the loss difference between the FM and HOM increases in general at a larger Δ. The dependence on Λ is more subtle at constant Δ.

The two dotted lines on FIGS. 8-14 represent the 0.1 dB/m and 10 dB/m loss levels. It can be clearly seen in FIG. 13 that these targets be met for Λ=15.5 μm, corresponding to a core diameter of about 55 μm for a seven cell fiber, and an FM/HOM differential mode loss of over 4 orders of magnitudes can be realized.

Example 2

Figure 15:
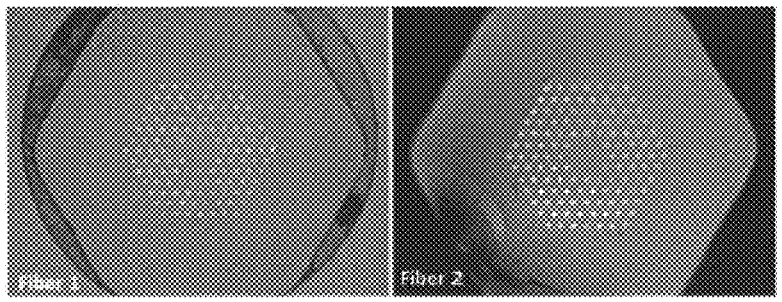
FIG. 15A and FIG. 15B illustrate cross sectional images of two fabricated fibers.

Two fibers were fabricated, cross sections of which are illustrated in FIG. 15A (Fiber 1) and FIG. 15B (Fiber 2). The nodes in the cladding of Fiber 1 were made from a graded index multi-mode optical fiber preform with germanium doped core with peak Δ=1.72%. The nodes of Fiber 2 were made from a step-index preform with germanium doped core with peak Δ=1.52%. Fibers 1 and 2 had respective core diameters of 55.1 μm and 49.1 μm.

The characteristics of the two fibers are shown in Table 1, below

TABLE 1

| Fiber | Λ (μm) | d (μm) | d/Λ | 2ρ (μm) | OD (flat to flat, μm) | OD (corner to corner, μm |
|---|---|---|---|---|---|---|
| 1 | 15.3 | 6.1 | 0.4 | 55.1 | 373 | 411 |
| 2 | 13.0 | 5.3 | 0.41 | 49.1 | 330.3 | 365.7 |

Figure 16:
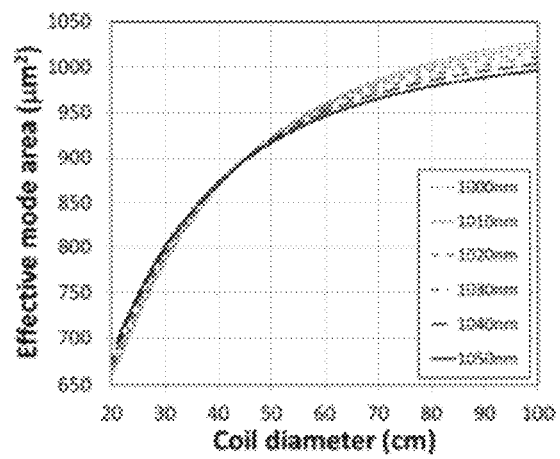
FIG. 16 illustrates the simulated effective area of the fiber of FIG. 15A versus coil diameter.

The effective mode area of Fiber 1 was simulated at various coiling diameters as illustrated in FIG. 16, showing an effective area of about 900 μm$^2$ at a wavelength of 1050 nm and a coil diameter of 30 cm. An effective are of about 920 μm$^2$ could be achieved when using 50 cm coil diameter. There was no significant variation in mode areas when wavelength was changed within the bandgap (FIG. 16).

Figure 17:
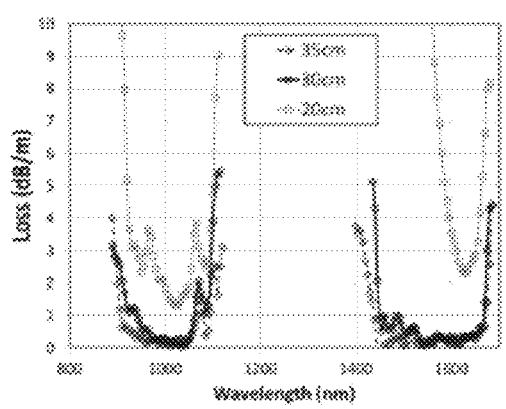
FIG. 17 illustrates the loss of the fiber of FIG. 15A at coiling diameters of 20 cm, 30 cm, and 35 cm.
Figure 19:
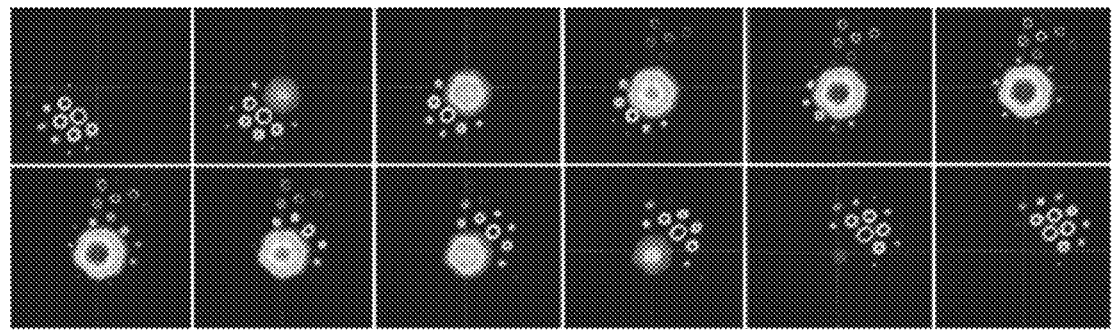
FIG. 19 illustrates the near field pattern at the output of 2 meters of the fiber of FIG. 15A coiled at 30 cm while a launch beam is moved across the center of the fiber.

The bend-dependent loss was measured for Fiber 1 by setting the coil diameters to 20 cm, 30 cm and 35 cm and performing cut-back measurements. The result is shown in FIG. 17. The target coil diameter was 30 cm. At the center of the third bandgap at about 1.05 μm, very little bend dependent loss was measured at the target coil diameter. At 20 cm, significant bend induced loss was seen. Also shown is the much stronger bend-induced loss in the second bandgap at about 1.55 μm. This was expected, due to the shallower band depth for this even bandgap. Single mode output of 2 meters of Fiber 1 coiled at 30 cm diameters was tested qualitatively by monitoring the near field output pattern while the launch beam was moved across the front face of the fiber (FIG. 19). No sign of higher order modes was present during the entire process, indicating fairly robust single mode operation.

Figure 18:
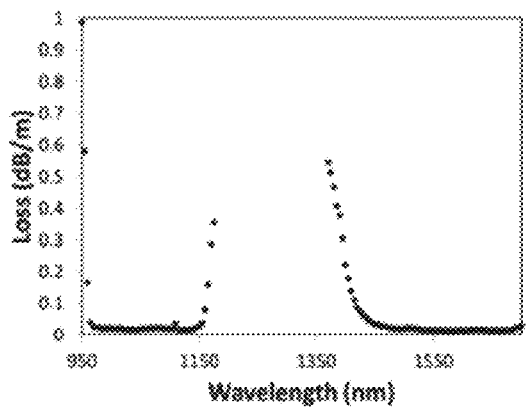
FIG. 18 illustrates the loss of the fiber of FIG. 15B measured with the fiber in a loose coil.

The loss of Fiber 2 is shown in FIG. 18. The fiber was loosely coiled for the measurement in FIG. 18. It was also confirmed that the loss in the center of the third band around 1050 nm was hardly changed when the fiber was coiled down to 30 cm. More quantitative mode analysis on Fiber 2 was performed with an S$^2$ setup (Nicholson, et al., Opt. Express 16(10), 7233-7243 (2008)) implemented with a rapidly tunable external cavity diode laser from 1020 nm to 1085 nm, a wave meter and a CCD camera. In all measurements, input and output polarizers were used and both were aligned to the birefringence axis in the fiber. The photonic bandgap fibers were found to have a weak birefringence due to asymmetries introduced during fiber fabrication. The setup was capable of performing necessary S$^2$ measurement quickly and resolving mode power below −35 dB of fundamental mode.

Figure 20:
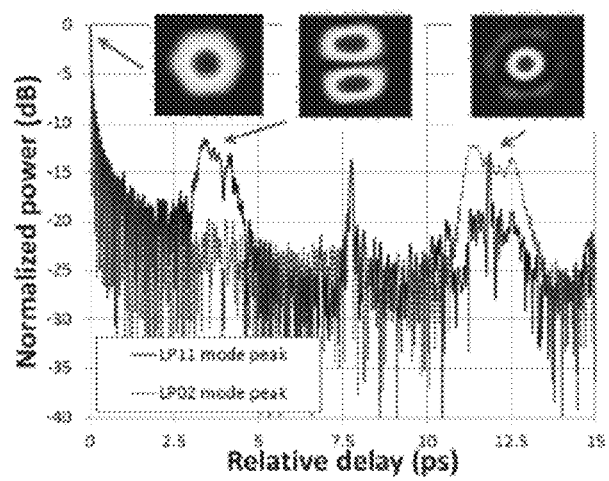
FIG. 20 illustrates the power vs. delay curves at intensity peak position of LP11 and LP02 modes for the fiber of FIG. 15B at a coil diameter of 30 cm. The insets show the reconstructed modes at the designated delays by $S^2$ measurements.
Figure 21:
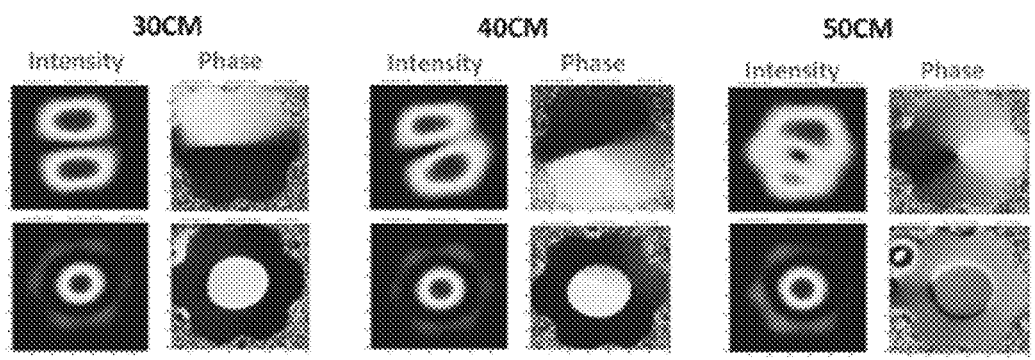
FIG. 21 illustrates the resolved higher order modes in the fiber of FIG. 15B at coil diameters of 30 cm, 40 cm, and 50 cm.
Figure 22:
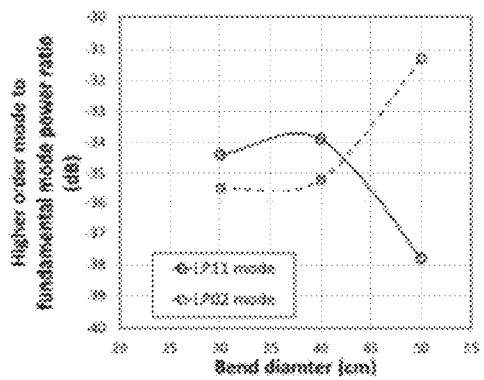
FIG. 22 illustrates the relative LP11 and LP02 modes contents for the fiber of FIG. 15B at various coiling diameters.

S$^2$ measurements were performed on 6 meters of Fiber 2 coiled at 30 cm, 40 cm, 50 cm and 80 cm while efforts were made to ensure launch was not altered while changing coil diameter. The normalized power versus total relative delay is plotted in FIG. 20 for the 30 cm coil diameter at two positions on CCD, one at peak of LP11 mode intensity (solid line) and one at LP02 mode peak intensity (dotted line). The plot in FIG. 20 shows the Fourier transform of power beating between high order modes and fundamental mode in which the beating amplitude is proportional to the ratio of their electric field. The mode image and content were calculated using the peak in the curves for respective modes. The two sharp peaks at 7.7 ps and 11.8 ps were from interferometers formed by bulk optics in the system. These features were well characterized prior to these measurements. The broad peaks at about 4 ps and about 12 ps were from LP11 and LP02 modes respectively. The resolved mode patterns were plotted and are shown in FIG. 21 for 30 cm, 40 cm, and 50 cm bending ratios, as described. The measured LP11 and LP02 mode contents are shown in FIG. 22 at various coiling diameters. Below 40 cm coil diameters, the LP11 and LP02 mode contents did not seem to vary very much and the mode contents were below −33 dB for both observed modes. No other higher order modes were observed. Over 30 dB higher order mode suppression could be achieved at coil diameter of 50 cm as shown in FIG. 22, demonstrating an effective mode area of about 920 μm$^2$ for the photonic bandgap fibers.

Figure 23:
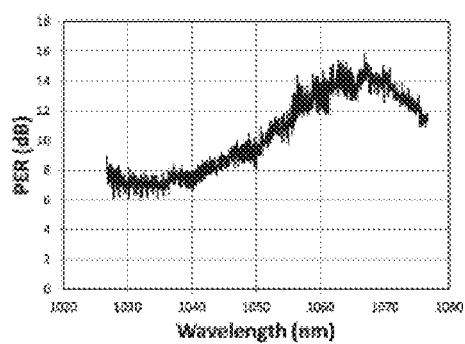
FIG. 23 illustrates the measured PER in 6 meters of the fiber of FIG. 15B at a coiling diameter of 50 cm.

Fiber birefringence could also be measured using the S$^2$ setup by aligning both input and output polarizers at a 45 degree angle to the fiber birefringence axes. The polarization mode beating leads to a sharp peak in the delay curve. The group birefringence can then be calculated from this measured polarization mode delay. This was done for Fiber 2, resulting in a measured birefringence of 3.1×10$^{-6}$. Polarization mode extinction ratio (PER) was measured for 6 meters of Fiber 2. This is shown in FIG. 23. It is interesting to note that PER as high as 14 dB were achieved in this nominally non-PM fiber. This birefringence was a result of geometry asymmetry introduced during the fabrication process.

Example 3

Figure 24:
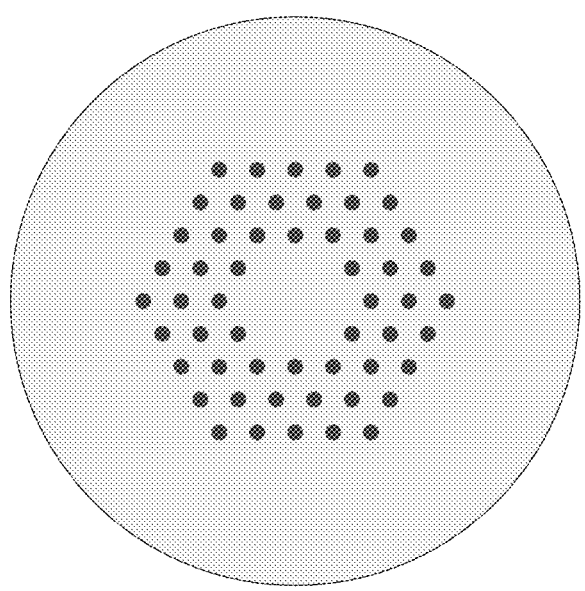
FIG. 24 is a schematic view of a fiber as described herein.
Figure 25:
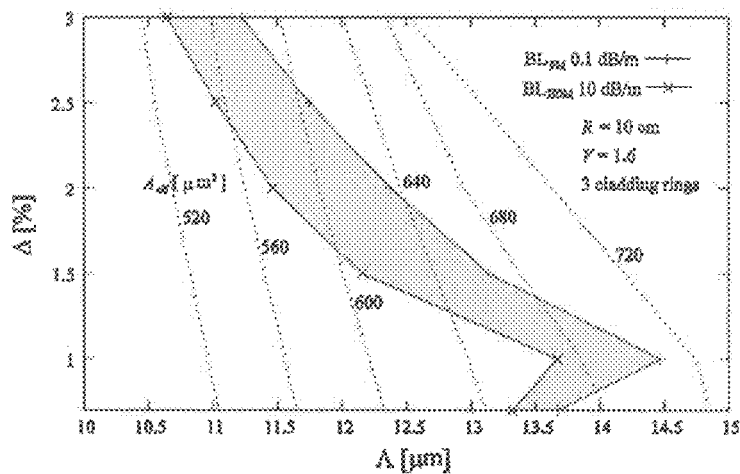
FIG. 25A presents a design regime satisfying bending loss for the fundamental mode of less than 0.1 dB/m and the higher order mode of larger than 10 dB/m for fibers at a bending radius of 10 cm and a normalized frequency of 1.6.
FIG. 25B presents a design regime satisfying bending loss for the fundamental mode of less than 0.1 dB/m and the higher order mode of larger than 10 dB/m for fibers at a bending radius of 10 cm and a normalized frequency of 4.65.
FIG. 25C compares the results shown in FIG. 25A and FIG. 25B.
Figure 25:
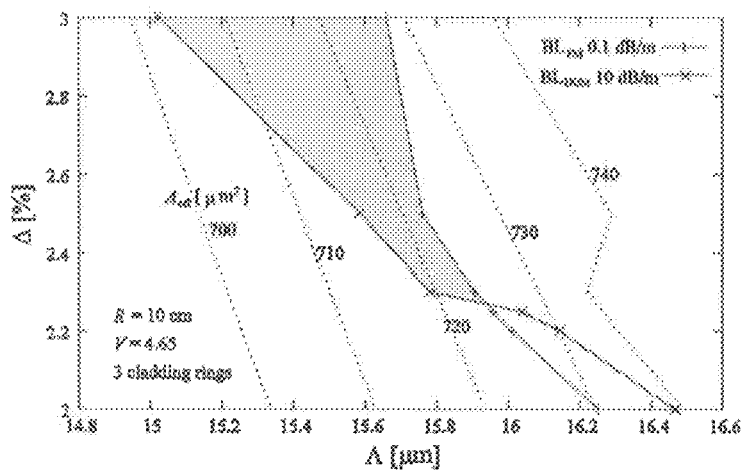
Figure 25:
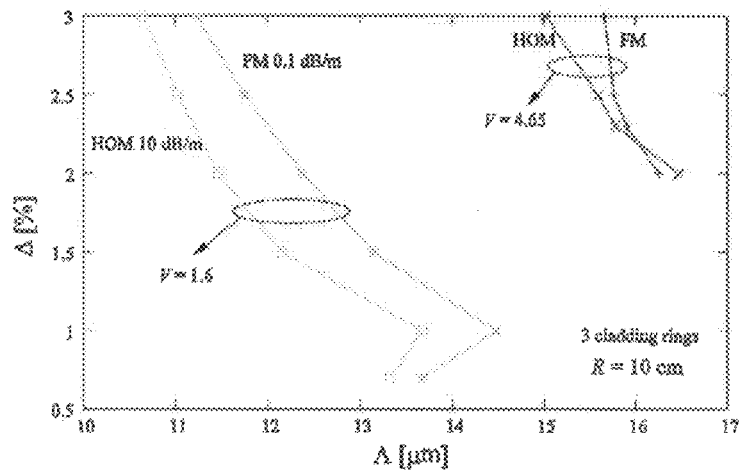
Figure 31:
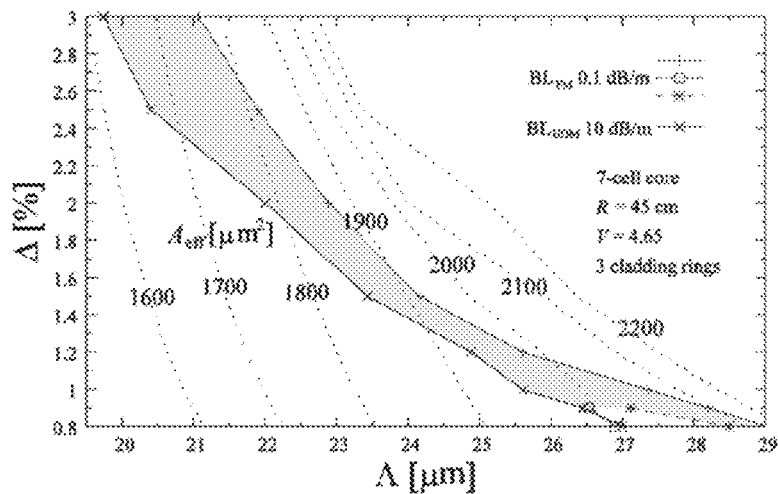
FIG. 31 presents a design regime satisfying bending loss for the fundamental mode of less than 0.1 dB/m and the higher order mode of larger than 10 dB/m for fibers at a bending radius of 45 cm and a normalized frequency of 4.65.
Figure 32:
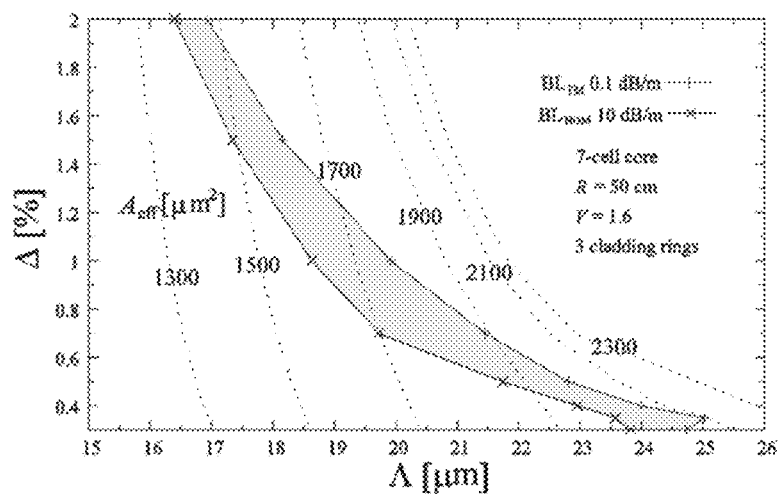
FIG. 32 presents a design regime satisfying bending loss for the fundamental mode of less than 0.1 dB/m and the higher order mode of larger than 10 dB/m for fibers at a bending radius of 50 cm and a normalized frequency of 1.6.

The relationship between Λ and Δ was simulated for photonic bandgap fibers as described herein at defined normalized frequency, V, over bending radii including 10 cm (FIG. 25), 15 cm (FIG. 26), 20 cm (FIG. 27), 25 cm (FIG. 28), 35 cm (FIG. 29), 40 cm (FIG. 30), 45 cm (FIG. 31), and 50 cm (FIG. 32). The fibers included a seven cell core and three cladding layers, as illustrated in FIG. 24. The operating wavelength λ of the simulations was 1064 nm.

For each bending ratio between 10 cm and 40 cm, the figures present the relationship at V=1.6 (FIGS. 25A, 26A, 27A, 28A, 29A and 30A) and at V=4.65 (FIGS. 25B, 26B, 27B, 28B, 29B, and 30B). An overlay of the two simulations is also provided (FIGS. 25C, 26C, 27C, 28C, 29C, and 30C).

FIG. 31 illustrates the simulation at V=4.65 and a bending radius of 45 cm, and FIG. 32 illustrates the simulation at V=1.6 and a bending radius of 50 cm.

Figure 33:
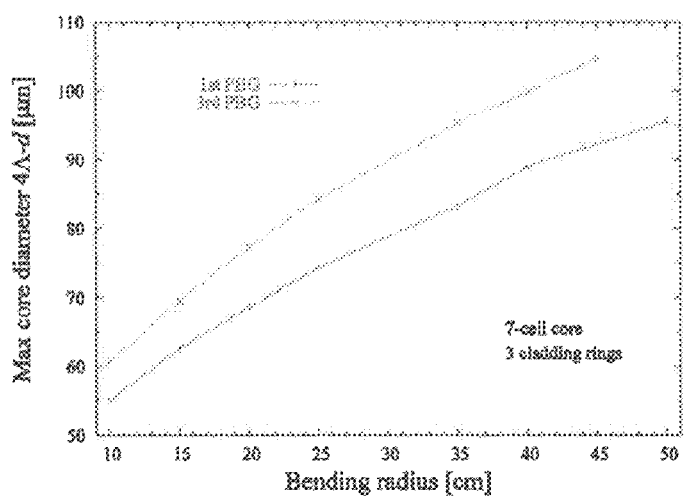
FIG. 33 presents the maximum core diameter (FIG. 33A), the maximum pitch (FIG. 33B) and the maximum Δ (FIG. 33C) for fibers as described herein having a normalized frequency of 1.6 and 4.5.
Figure 33:
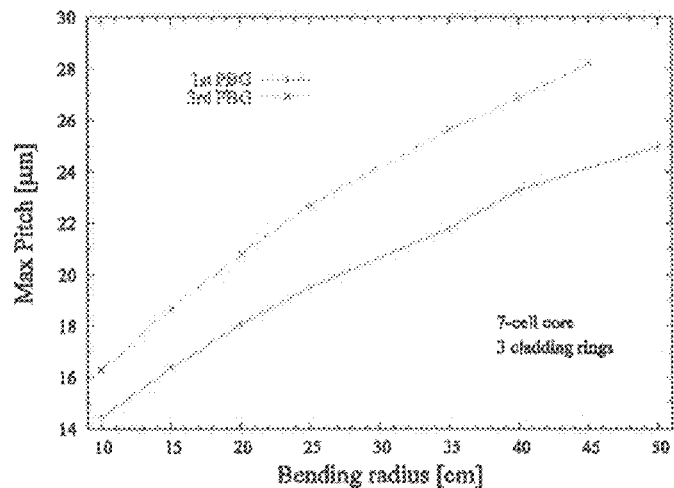
Figure 33:
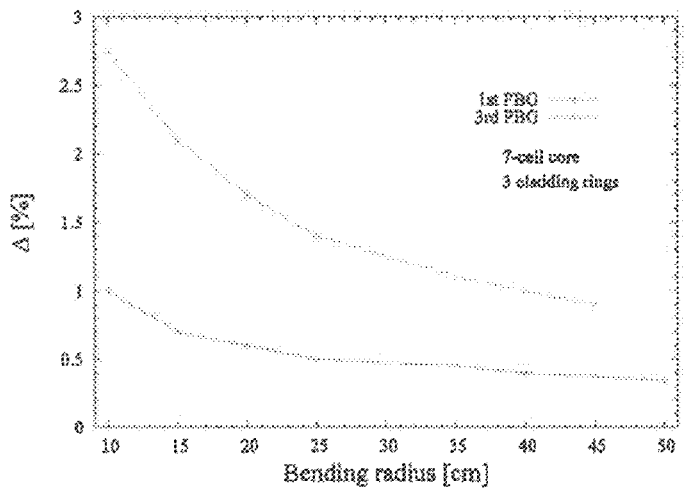

FIGS. 33A, 33B, and 33C present the maximum core diameter, the maximum pitch, and the relative node index, respectively, for each of the simulated bending radii.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A photonic bandgap optical fiber comprising:
   a solid core having a diameter of 50 micrometers or greater; and
   a solid cladding including a plurality of nodes, each node having a diameter and each node being surrounded in the cross sectional direction of the fiber by a background material, the refractive index of the nodes being greater than the refractive index of the background material, the nodes being arranged with respect to one another so as to define a minimum pitch and a maximum pitch and to form a cladding lattice surrounding the solid core, the maximum pitch being large than the minimum pitch, the cladding lattice defining a plurality of first areas consisting of background material that are surrounded by multiple nodes and a plurality of second areas consisting of background material that are surrounded by multiple nodes, the first areas being larger than the second areas, the first areas and the second areas forming a pattern surrounding the solid core;
   the photonic bandgap fiber having an effective mode area of about 700 μm² or greater and a loss in a fundamental mode of about 1 decibel per meter or less, and the photonic bandgap fiber having a loss in higher order modes of about 5 decibel per meter or greater, the fiber having a relative node index, Δ, of from 0.5% to about 5%, wherein $\Delta(\%) = ((n_h^2 - n_b^2)/(2n_h^2)) \times 100$, in which $n_h$ is the highest refractive index of the nodes, and
   $n_b$ is the refractive index of the background.

2. The photonic bandgap optical fiber of claim 1, wherein the fiber has a loss in the fundamental mode of about 0.1 decibel per meter or less.

3. The photonic bandgap optical fiber of claim 1, wherein the fiber has a loss in the higher order modes of about 10 decibels per meter or greater.

4. The photonic bandgap optical fiber of claim 1, wherein the fiber has a loss in the higher order modes that is more than about 20 decibels above the loss in the fundamental mode.

5. The photonic bandgap optical fiber of claim 1, wherein the ratio of the loss in the higher order modes to that in the fundamental mode differs by at least one order of magnitude.

6. The photonic bandgap optical fiber of claim 1, wherein the fiber operates in the third bandgap.

7. The photonic bandgap optical fiber of claim 1, wherein the fiber operates in the second bandgap.

8. The photonic bandgap fiber of claim 1, wherein the ratio of the node diameter to the minimum pitch is about 0.2 or greater.

9. The photonic bandgap fiber of claim 1, wherein the minimum pitch is between about 5 and about 60 micrometers.

10. The photonic bandgap fiber of claim 1, wherein the node diameter is between about 4 micrometers and about 20 micrometers.

11. The photonic bandgap fiber of claim 1, wherein the core, the nodes and the background all comprise silicon dioxide.

12. The photonic bandgap fiber of claim 1, wherein the core comprises a laser active on dopant.

13. The photonic bandgap fiber of claim 1, wherein the cladding lattice includes about 5 layers of nodes or less.

14. The photonic bandgap fiber of claim 1, further comprising a pump cladding.

15. An optical system containing the photonic bandgap fiber of claim 1.

16. A method for forming the photonic bandgap fiber of claim 1 comprising:
    arranging a plurality of rods to form a stack, the plurality of rods including multiple core rods and multiple clad rods, wherein at least a portion of the clad rods comprise a background area and a node area, the core rods forming a stack core and the dad rods surrounding the stack core in the cross sectional dimension of the stack, the node areas arranged in the stack with respect to one another so as to form a stack cladding lattice; and
    drawing the stack.

17. The method of claim 16, wherein the stack core is formed of identical core rods.

18. The method of claim 16, further comprising forming the clad rods.

19. The method of claim 16, wherein the clad rods are formed according to a chemical vapor deposition process.

20. The method of claim 16, further comprising fusing the stack.

21. The method of claim 16, further comprising inserting the stack into an outer cylinder prior to drawing the stack.

22. The method of claim 16, the plurality of rods further comprising buffer rods and/or pump cladding rods.

23. The photonic bandgap optical fiber of claim 1, the fiber having a normalized frequency from 4.1 to 5, the normalized frequency being determined according to the relationship $V = (\pi d/\lambda)((n_h^2 - n_b^2))^{1/2}$ wherein
    V is the normalized frequency
    d is the diameter
    λ is an operating wavelength.

24. The photonic bandgap optical fiber of claim 1, the fiber having an effective mode area of about 2000 μm² or greater.

25. A photonic bandgap optical fiber comprising:
    a solid core having a diameter of 50 micrometers or greater; and
    a solid cladding including a plurality of nodes, each node having a diameter and each node being surrounded in the cross sectional direction of the fiber by a background material, the refractive index of the nodes being greater than the refractive index of the background material, the nodes being arranged with respect to one another so as to define a minimum pitch and a maximum pitch and to form a cladding lattice surrounding the solid core, the maximum pitch being larger than the minimum pitch, the cladding lattice defining a plurality of first areas consisting of background material that are surrounded by multiple nodes and a plurality of second areas consisting of background material that are surrounded by multiple nodes, the first areas being larger than the second areas, the first areas and the second areas forming a pattern surrounding the core;
    the photonic bandgap fiber having an effective mode area of about 2000 μm² or greater.

* * * * *